(12) United States Patent
Azmandian et al.

(10) Patent No.: US 11,865,447 B2
(45) Date of Patent: Jan. 9, 2024

(54) METHODS AND SYSTEMS FOR SPECTATING CHARACTERS IN FOLLOW-MODE FOR VIRTUAL REALITY VIEWS

(71) Applicant: Sony Interactive Entertainment Inc., Tokyo (JP)

(72) Inventors: Mahdi Azmandian, San Mateo, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 365 days.

(21) Appl. No.: 17/177,157

(22) Filed: Feb. 16, 2021

(65) Prior Publication Data

US 2021/0178264 A1 Jun. 17, 2021

Related U.S. Application Data

(63) Continuation of application No. 16/355,668, filed on Mar. 15, 2019, now Pat. No. 10,918,945.

(51) Int. Cl.
| | |
|---|---|
| *A63F 13/00* | (2014.01) |
| *A63F 13/5258* | (2014.01) |
| *A63F 13/5252* | (2014.01) |
| *A63F 13/86* | (2014.01) |
| *G06F 3/04815* | (2022.01) |
| *H04L 67/131* | (2022.01) |

(52) U.S. Cl.
CPC ...... *A63F 13/5258* (2014.09); *A63F 13/5252* (2014.09); *A63F 13/86* (2014.09); *G06F 3/04815* (2013.01); *A63F 2300/577* (2013.01); *A63F 2300/6669* (2013.01); *A63F 2300/6684* (2013.01); *A63F 2300/8082* (2013.01); *H04L 67/131* (2022.05)

(58) Field of Classification Search
None
See application file for complete search history.

(56) References Cited

U.S. PATENT DOCUMENTS

| | | | | |
|---|---|---|---|---|
| 6,304,267 B1* | 10/2001 | Sata | ........................ | G06T 15/10 |
| | | | | 345/419 |
| 9,327,191 B2* | 5/2016 | Miyamoto | ............ | A63F 13/335 |
| 2003/0210329 A1* | 11/2003 | Aagaard | .............. | H04N 17/002 |
| | | | | 348/E7.086 |
| 2006/0146132 A1* | 7/2006 | Mayerson | .............. | H04N 23/90 |
| | | | | 348/E7.086 |
| 2007/0188501 A1* | 8/2007 | Yee | ........................ | G06T 15/20 |
| | | | | 345/473 |

(Continued)

*Primary Examiner* — Paul A D'Agostino
(74) *Attorney, Agent, or Firm* — Penilla IP, APC

(57) ABSTRACT

Methods and systems for spectating a live video game are presented. In one embodiment, a method for performing an automated catch-up to a player is provided. The method includes providing an interface for presenting a first view of a video game on a client device where the first view has a first vantage point and includes a game player. The method includes an operation for providing a portal within the interface for presenting a second view of the game object, the second view having a second vantage point. The method further includes an operation for moving the second vantage point toward the game object within the portal. Additionally, the method provides an operation for removing the portal.

8 Claims, 13 Drawing Sheets

(56) References Cited

U.S. PATENT DOCUMENTS

| | | | |
|---|---|---|---|
| 2007/0279494 A1* | 12/2007 | Aman | G06V 20/40 |
| | | | 348/169 |
| 2008/0079754 A1* | 4/2008 | Kuroki | H04N 21/4312 |
| | | | 386/280 |
| 2009/0290848 A1* | 11/2009 | Brown | H04N 23/695 |
| | | | 348/E5.022 |
| 2010/0151943 A1* | 6/2010 | Johnson | G07F 17/32 |
| | | | 463/32 |
| 2014/0184801 A1* | 7/2014 | Choi | G06V 10/25 |
| | | | 348/158 |
| 2015/0352437 A1* | 12/2015 | Koseki | A63F 13/5255 |
| | | | 463/31 |
| 2016/0320951 A1* | 11/2016 | Ernst | H04N 23/90 |
| 2017/0001118 A1* | 1/2017 | Ibrahim | H04N 21/23418 |
| 2017/0099441 A1* | 4/2017 | Choi | H04N 9/8042 |
| 2017/0269685 A1* | 9/2017 | Marks | A63F 13/533 |
| 2018/0359427 A1* | 12/2018 | Choi | H04N 21/4223 |
| 2020/0145623 A1* | 5/2020 | Sadanand | G06V 20/46 |

* cited by examiner

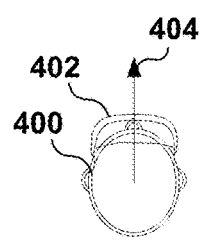 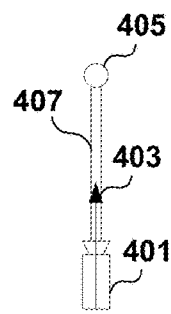 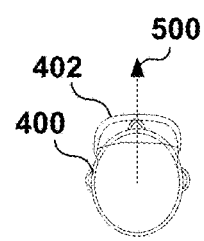 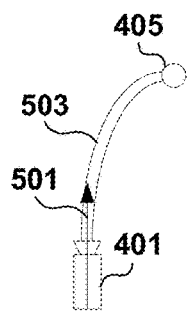
Fig. 4A    Fig. 5A
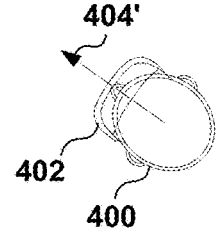 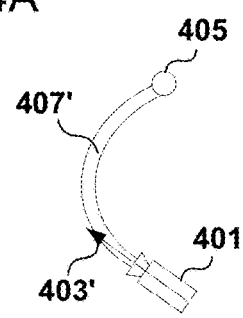 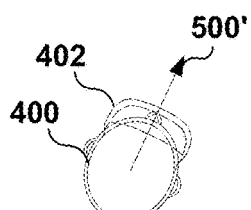 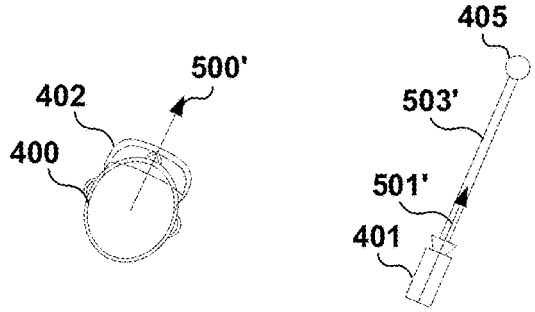
Fig. 4B    Fig. 5B
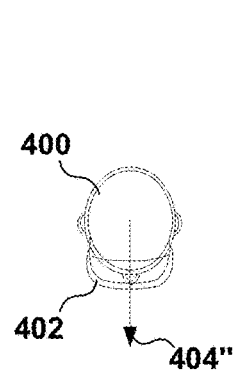 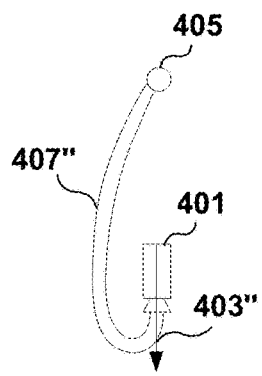 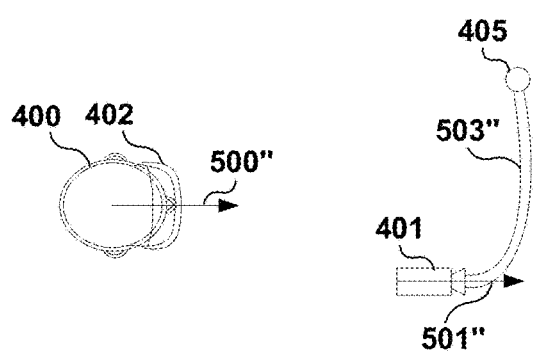
Fig. 4C    Fig. 5C

METHODS AND SYSTEMS FOR SPECTATING CHARACTERS IN FOLLOW-MODE FOR VIRTUAL REALITY VIEWS

CLAIM OF PRIORITY

This application is a Continuation of U.S. patent application Ser. No. 16/355,668, filed on Mar. 15, 2019 (U.S. Pat. No. 10,918,945, issued on Feb. 16, 2021), entitled "METHODS AND SYSTEMS FOR SPECTATING CHARACTERS IN FOLLOW-MODE FOR VIRTUAL REALITY VIEWS," which is herein incorporated by reference.

RELATED APPLICATION

This Application is related to U.S. patent application Ser. No. 16/355,635, entitled "METHODS AND SYSTEMS FOR SPECTATING CHARACTERS IN VIRTUAL REALITY VIEWS," filed Mar. 15, 2019, which is herein incorporated by reference.

FIELD OF THE DISCLOSURE

The present disclosure relates generally to virtual reality applications, and more particularly, to methods and systems for providing spectating views.

BACKGROUND

Virtual reality is becoming an increasingly popular way for consumers to interact with content. This is especially true in the context of video games. Currently, both players and spectators are able to interact with a video game in virtual reality (VR) via a head mounted display (HMD). A spectator is typically given a spectator view that is generated by introducing a camera within the environment of the game. The spectator may be able to navigate the environment of the video game via a controller to view the game action of the video game. For example, a spectator may choose to follow a certain player to view the performance of that player.

Current methods of spectating video games via HMD have certain drawbacks in terms of navigability, usability, comfort, and functionality. For example, currently it may be difficult for a spectator to navigate a game environment in a desired manner to view the various happenings that are of interest to the spectator. Additionally, current methods of spectating do not allow spectators to follow or catch-up to a target player in an effective and comfortable way.

It is in this context that embodiments arise.

SUMMARY

Embodiments of the present disclosure relate to improved methods and systems for enabling a spectator to follow a target player.

In one embodiment, a method is provided. The method includes an operation for providing an interface for presenting a first view of the video game on a client device of the spectator of the video game, the first view having a first vantage point and includes a target object. The method also includes an operation for providing a portal within the interface for presenting a second view of the target object, the second view having a second vantage point, the portal is overlaid to cover a portion of the first view. Further, the method includes an operation for moving the second vantage point toward the target object such that a virtual position of the spectator is brought closer to the target object within the portal, while the first view remains at the first vantage point outside the portal. Moreover, the method includes an operation for wiping away the portal during at least a portion of said moving the second vantage point, said wiping away the portal includes expanding a size of the portal such that the second view replaces the first view in the interface.

In another embodiment, a method includes an operation for providing an interface for presenting a first view of the video game on a client device of the spectator of the video game, the first view having a first vantage point and includes a target object. The method also includes an operation for determining that the target object has moved beyond a first pre-defined threshold away from the first vantage point and executing a rubber-banding function, the rubber-banding function renders a band for display in the interface that connects the spectator to the target object. Additionally, the method includes an operation for determining that the target object has moved beyond a second pre-defined threshold away from the first vantage point and executing a catch-up function, the catch-up function includes. In various embodiments, the catch-up function includes an operation for providing a portal within the interface for presenting a second view of the target object, the second view having a second vantage point, the portal is overlaid to cover a portion of the first view. The catch-up function also includes an operation for moving the second vantage point toward the target object to a third vantage point such that the virtual position of the spectator is brought closer to the target object within the portal, while the first view remains at the first vantage point outside of the portal.

In another embodiment, a non-transitory computer-readable storage medium storing a computer program executable by a processor-based system for transporting a spectator within an environment of a video game is provided. The non-transitory computer-readable storage medium includes program instructions for providing an interface for presenting a first view of the video game on a client device of the spectator of the video game, the first view having a first vantage point and includes a target object. The non-transitory computer-readable storage medium also includes program instructions for providing a portal within the interface for presenting a second view of the target object, the second view having a second vantage point, the portal is overlaid to cover a portion of the first view. Additionally, the non-transitory computer-readable storage medium includes program instructions for moving the second vantage point toward the target object such that a virtual position of the spectator is brought closer to the target object within the portal, while the first view remains at the first vantage point outside the portal. Moreover, the non-transitory computer-readable storage medium includes program instructions for wiping away the portal during at least a portion of said moving the second vantage point, said wiping away the portal includes expanding a size of the portal such that the second view replaces the first view in the interface.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 4A-4C show conceptual illustrations of the properties of the rubber-banding function that connects the spectator to a target player, according to one embodiment.

FIGS. 5A-5C show conceptual illustrations of the properties of the rubber-banding function, according to another embodiment.

DETAILED DESCRIPTION

Figure 1A:
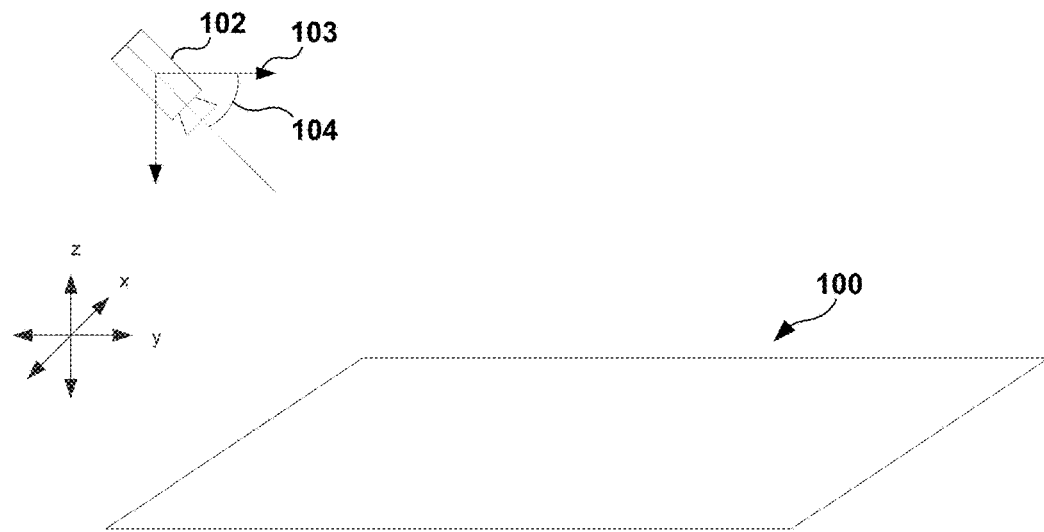
FIG. 1A shows a conceptual diagram of a camera used to capture an overhead view shown in FIG. 1B, according to one embodiment.

Embodiments of the present disclosure relate to improved methods and systems for spectating video games. Some embodiments of the present disclosure relate to methods of providing seamless transitions between various third-person views of a player. Embodiments of the present disclosure also relate to methods for providing a catch-up function that enables a spectator to automatically follow a player of interest. In some embodiments, the methods can by implemented via one or more head mounted displays (HMDs). It will be obvious, however, to one skilled in the art, that the present disclosure may be practiced without some or all of these specific details. In other instances, well known process operations have not been described in detail in order to not unnecessarily obscure the present disclosure.

Video game spectating is an important component in the video game ecosystem and provides users with an opportunity to derive entertainment from a video game without having to play it. Just as spectating a sports game, a race, or a concert is entertaining for spectators, the same is true of video games. A video game need not be played first-hand to be a source of entertainment, just as a bobsledding race need not be raced first-hand to be a source of entertainment. Video games, however, can offer a spectating experience that is more immersive, engaging, and customized than that of other activities. Because video game action takes place in a virtual interactive environment, virtual cameras that capture spectator views are not limited in the ways real-life cameras are when capturing real-life action. For example, real-life cameras for capturing real-life spectating activities are limited by the costs of camera equipment, camera operation and broadcast, as well the impracticability of placing cameras at various areas on interest.

Spectating video games are confined by none of these. For example, it is possible to introduce cameras at virtually any location within a virtual interactive environment and to move them in a desired way to provide immersive and user-controlled spectator views. For example, it is possible to obtain overhead or top-down views for spectating the overall happenings of a video game by placing a virtual camera at an elevated position above the virtual interactive environment. It is also possible to obtain third-person views and over-the-shoulder views that are relatively close to a selected player to see in greater detail that player's actions. Moreover, it is possible to enable a spectator to control a virtual camera used to generate a spectator view, such as to move a camera location or to pan the camera.

However, while a greater number of views are possible with video game spectating, current methods are lacking in the way they manage the greater number of views as well as how comfortable the spectating experience is within a virtual reality setting. For example, current methods do not provide ways to seamlessly transition between various viewpoints, such as between different third-person views having differing vantage points. Current methods transport a spectator within a virtual environment by providing translational movement to a virtual camera used to capture the spectator view. However, such movements can be disorienting and hard to follow, especially when the view is supplied to a VR view in an HMD. It has been observed that when spectators are moved translationally or rotationally within a VR scene without a sense of agency over the movement, disorientation may result.

Current methods also do not address a way to allow a spectator to automatically catch-up or follow a player of interest. For example, current methods either require a spectator to manually follow a player or provide fixed views that follow a player. The former method can become tiring and distracting for a spectator, especially during complex multiplayer games sessions of extended length. The latter method has been observed to cause disorientation because of the jerky nature of the fixed spectator view. The embodiments contemplated here address these and other shortcomings associated with current video game spectating technology.

Embodiments described here solve current problems related to spectator viewing technology in the computer-related arts by providing computer-implemented "follow assist" functions that enable a spectator to seamlessly follow a target player. The follow-assist functions include a rubber-banding function that enables the spectator to manually follow the target player as well as a catch-up function that automatically transports the spectator using portal-mediated transitions.

Portal-mediated transitions are contemplated to be used when a vantage point of a spectator is to be moved such that the spectator experiences translational and rotational movements via a portal rather than experiencing the translational and rotational movement in a full field of view. The portal-mediated transitions include providing a portal that initially appears larger in size and constricts to a smaller size to restrict the spectator's field of view. The spectator's vantage point is then provided with translational and rotational movement to a desired destination within the portal while the area outside of the portal remains relatively static. In this manner, the spectator is made to focus on the area within the HMD display where movement occurs while the spectator's peripheral vision is not stimulated by movement. Portal-mediated transitions have been observed to result in more comfortable virtual movements with less disorientation for HMD spectators.

Figure 1B:
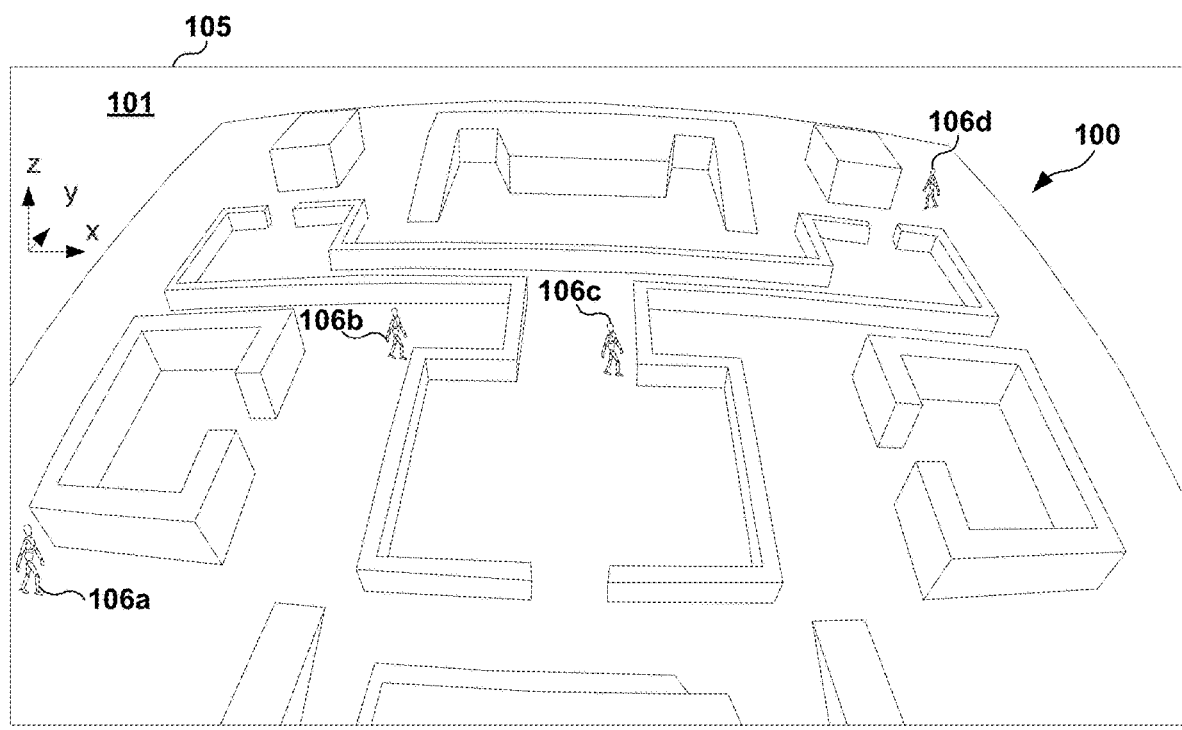
FIG. 1B shows an illustration of an interface having an overhead view of an interactive environment of a video game generated by camera of FIG. 1A, according to one embodiment.

FIG. 1A shows a conceptual diagram of a camera 102 used to capture an overhead view 101 shown in FIG. 1B, according to one embodiment. The camera 102 is placed at an elevated altitude in the z-axis to capture overall game action occurring in an interactive environment 100 of a video game. As such, the altitude, or z-coordinate, of the camera 102 used for capturing an overhead view will depend upon the video game and the size of the interactive environment 100. For a smaller interactive environment 100, the z-coordinate may be around 10 meters or less, while for a large interactive environment, the z-coordinate may be 100 meters or greater. The camera 102 is also angled at pitch 104 between 0° and −90° relative to the horizon 103 to capture the interactive environment 100 at a favorable angle. Additionally, because the overhead view is contemplated to be displayed as a VR scene within an HMD where the pitch 104 corresponds to spectator's real-world head pitch, the pitch 104 need not be vertical as to not strain the neck and head of the spectator.

FIG. 1B shows an illustration of an interface 105 having an overhead view 101 of an interactive environment 100 of a video game generated by camera 102 of FIG. 1A, according to one embodiment. The actions of a plurality of players 106a-d are captured in overhead view 101 to provide an overview of the general happenings of the interactive environment 100. For example, a spectator may choose to use the overhead view 101 to gain overall knowledge of the video game, such as where each of players 106a-d are positioned and where they are moving, which of players 106a-d are still active in the video game and which are eliminated, etc. However, the overhead view 101 may be less effective at conveying detailed game actions of the interactive environment 100 because the spectator is positioned relatively far away from individual players of the plurality of players 106a-d.

The spectator may have a target player they want to spectate at a closer distance, for example player 106b. Thus, they may choose to enter into a third-person view of player 106b from the overhead view 101. In some embodiments, the spectator may manually zoom into the overhead view 101 for the third-person view. In other embodiments, the spectator may use portal-mediated transitions to travel between the overhead view 101 and the third-person view as described. For example, the portal-mediated transitions may make use of a virtual magnifying glass that the spectator can enter into.

Figure 2A:
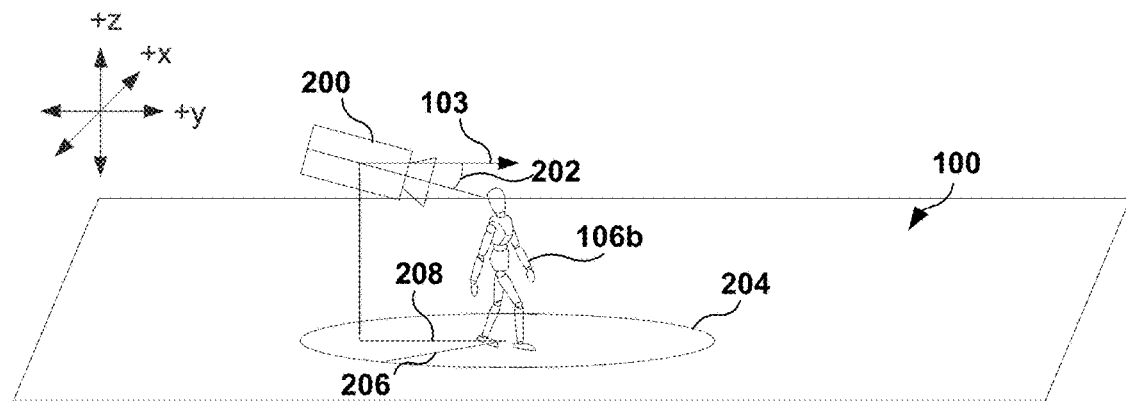
FIGS. 2A and 2B show conceptual illustrations of a camera placement diagram and a resulting third-person view, respectively, according to one embodiment.
Figure 2B:
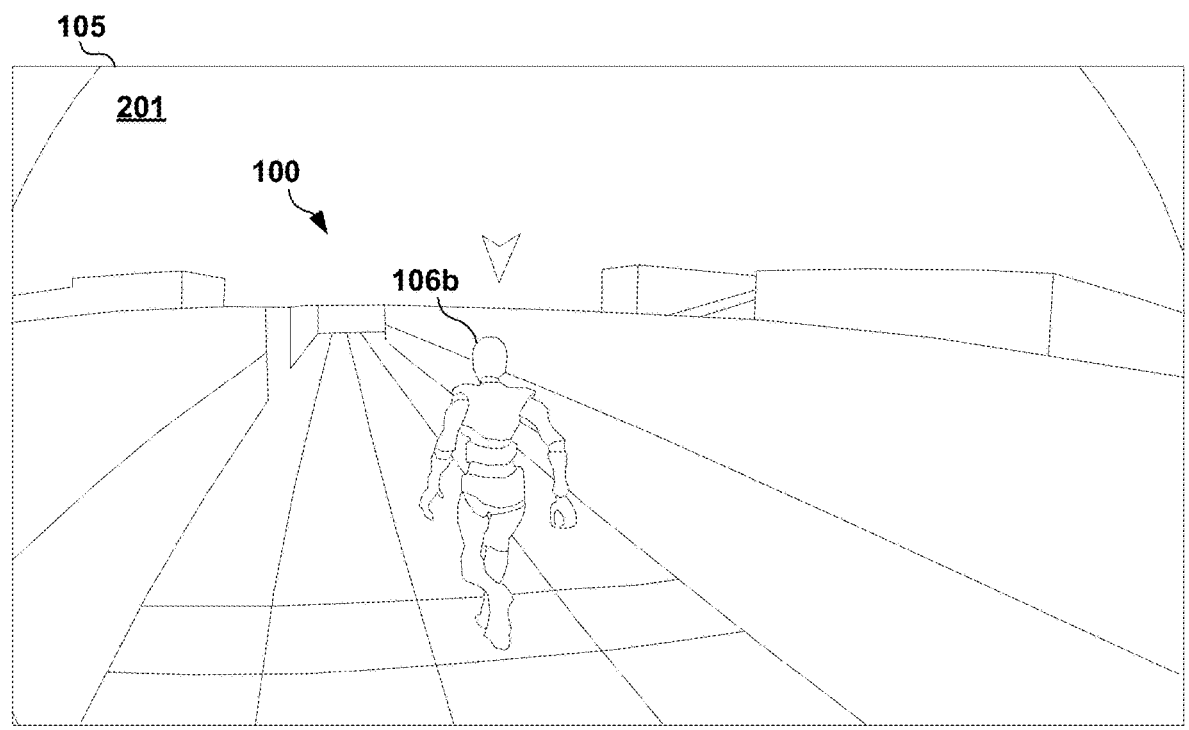

FIGS. 2A and 2B show conceptual illustrations of a camera placement diagram and a resulting third-person view 201, respectively, according to one embodiment. In FIG. 2A, the vantage point of camera 200 used to capture the third-person view 201 is shown to be placed in closer proximity to player 106b than that of camera 100. For example, camera 200 is less altitudinally elevated (e.g., lesser z-coordinate) from the plane of the interactive environment 100 camera 100. As a result, the third-person view 201 offers a view that is more immersive and that appears "in" the video game. The camera 200 may be associated with a pitch 202 that is between about +45° to about −45°, or between about +30° to about −30° from the horizon 103 depending upon the z-coordinate of the camera 200. The pitch 202 will also depend upon on a real-world pitch of the HMD of the user, according to some embodiments.

In various embodiments, the vantage point of camera 200 does not automatically follow the player 106b. As a result, the vantage point of camera 200 is controlled by the spectator independently of the movements of player 106b. Player 106b is shown to be associated with boundary 204 that represents a predefined threshold within which the x- and y-coordinates of the camera 200 lie. For example, the boundary 204 is shown to be circular in shape with a radius 206 of a predefined length, while the distance 208 between the camera 200 and the player 106b in a plane defined by the x- and y-axes is shown to be less than radius 206. It is contemplated that when the distance 208 between camera 200 and player 106b is less than the predefined threshold defined by radius 206, the third-person view is not augmented with "follow assist" features as will be described with reference to FIGS. 3A-3B and FIGS. 6A-6B. The spectator may thus manually navigate the interactive environment 100 to follow the player 106b.

FIG. 2B shows an illustration of a third-person view 201 of player 106b as captured by camera 200, according to one embodiment. The third-person view 201 is roughly altitudinally level with the interactive environment 100. For example, in the third-person view 201 shown, the spectator cannot necessarily see over the walls of the interactive environment 100. However, in various embodiments, the spectator may be enabled to see through walls such that players that are on the other side of a wall are shown as if the wall is translucent. When the spectator fails to remain within boundary 204, follow assist functions, such as a rubber-banding function or a catch-up function, will be executed to assist the spectator in following the player 106b. The particular follow assist function that is triggered will depend upon the distance separating the spectator from the player 106b.

Figure 3A:
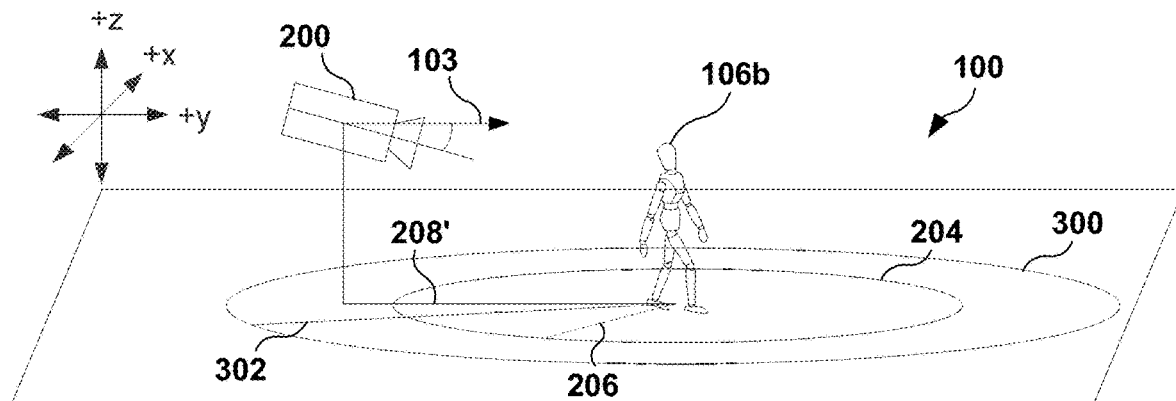
FIGS. 3A and 3B show an embodiment of a rubber-banding function that serves to assist the spectator in following the player, according to one embodiment.
Figure 3B:
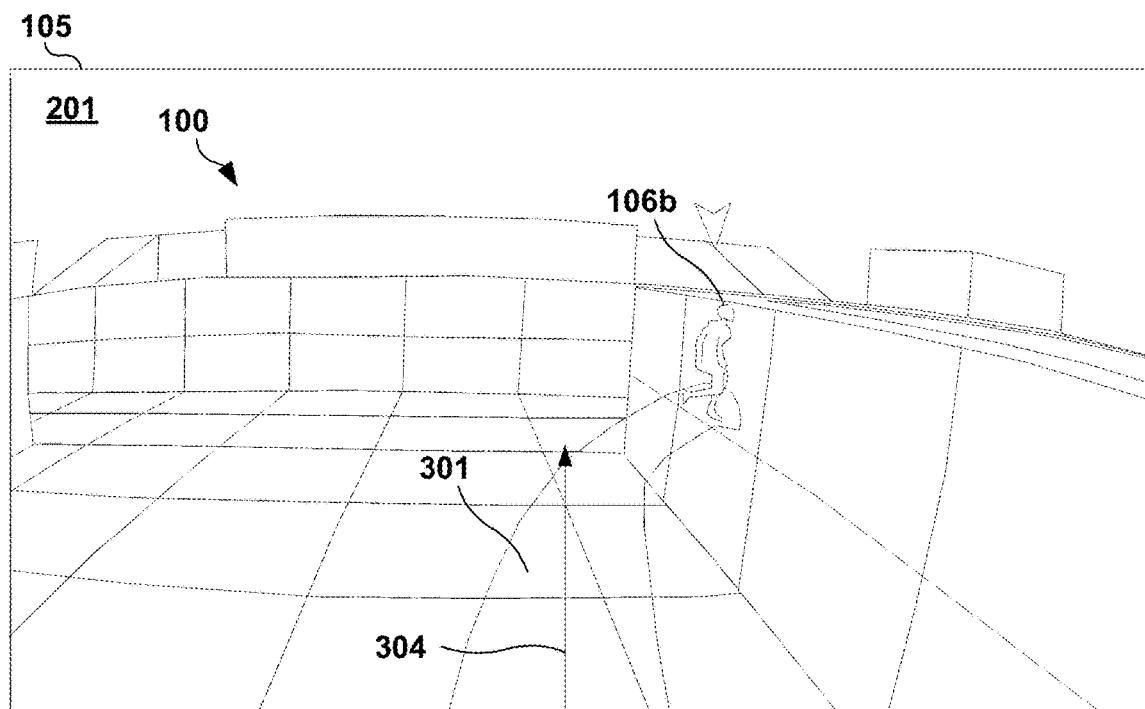

FIGS. 3A and 3B show an embodiment of a follow-assist function that serves to assist the spectator in following the player 106b once the player 106b is beyond radius 206 away from the spectator. In particular, the follow-assist function shown in FIGS. 3A and 3B is the rubber-banding function which enables to spectator to discern an approximated path the spectator can take to catch up to the player 106b. For example, the rubber-banding function provides a dynamic band that appears to connect the spectator to the player 106b. In this fashion, the spectator may explore (e.g., look around) the interactive environment 100 without losing track of the position of player 106b.

More particularly, FIG. 3A shows that camera 200 is currently a distance 208' away from the player 106b. This may result from the player 106b moving away from the spectator during the course of playing the video game or from the spectator moving away from the player 106b, or both. In any case, distance 208' is shown to be greater radius 206. However, distance 208' is shown to be less than radius 302 that defines a second circular boundary 300. It is contemplated that when distance 208' becomes greater than radius 206 but remains less than radius 302 (e.g., outside of boundary 204 but inside of boundary 300), the rubber-banding function is triggered. Once distance 208' becomes greater than radius 302, another follow-assist function called the catch-up function is activated or triggered. The catch-up function is described in greater detail with reference to FIGS. 6A and 6B.

FIG. 3B shows an illustration of a third-person view 201 with the rubber-banding function activated, according to one embodiment. Within the third-person view 201, a dynamic band 301 connects the spectator to the player 106b. The band 301 has elastic properties and stretches depending on the distance 208'. In addition to stretching, the band 301 is shown to bend or curve in the direction of player 106b. The direction the band 301 curves will depend upon where the player 106b is relative to a forward direction 304 of the spectator. In some embodiments, the band 301 may emanate from a bottom-center region of the interface 105, for example at or near where the feet or legs of the spectator would be. In this manner, the band 301 would be fully visible to the spectator without inhibiting the spectator's field of view. The band 301 is shown to terminate at player 106b, and more specifically toward the lower extremities of player 106b. Generally, the band 301 will emanate in the forward direction 304 initially for some distance before curving in the direction of the player 106b. In various embodiments, the forward initial direction may be implemented even if the spectator is facing away from the player (e.g., the player 106b is "behind" the spectator). In this instance, the band 301 will emanate in the forward direction 304 for a distance before curving to the left or right around the spectator to meet the player 106b.

The band 301 may take on a variety of visual effects. For example, the band 301 may be translucent or opaque or highlighted. Further, the band 301 may be color-coded to match a color of the player 106b. The band 301 may also project through walls, other players, and other in-game objects. Additionally, it is envisioned that the band 301 may be rendered to indicate that something interesting is happening at the target of the band 301. For example, the band 301 may be made to change color, intensity, or shape if the target (e.g., player 106b) is under attack or low on health. In these and other embodiments, the band 301 could also indicate distance between the spectator and the player 106b, for example, by a change in shape, intensity, or color. Further, it is contemplated that the rubber-banding function may selectively provide audio generated by the target that the spectator is connected to. For example, the spectator may be selectively communicated with audio generated by player 106b, even when player 106b travels far away from the spectator.

FIGS. 4A-4C show conceptual illustrations of the properties of band 407 of a rubber-banding function that connects the spectator 400 to a target player 405, according to one embodiment. In FIG. 4A, the spectator 400, and by extension the HMD 402, is facing direction 404 to the north. The camera 401 will also have a direction 403 facing the north. Since the target player 405 is positioned directly north of the camera 401, the band 407 appears straight. In FIG. 4B, the spectator 400 has turned toward the left to face direction 404' toward the northwest while the player 405 remains in the same location. Accordingly, camera 401 faces direction 403' that is similar to direction 404'. The band 407' is shown to shoot-out in direction 403' before curving to the right to meet player 405. In FIG. 4C, the spectator 400 has turned further to face a southerly direction 404" while the player 405 remains at the same location. Camera 401 likewise faces a southerly direction 403". In this scenario, the player 405 is located "behind" the spectator 400. To illustrate the position of the player 405 relative to the spectator 400, the band 407" emanates in the southerly direction 403" before curving 180° back toward the player 405.

FIGS. 5A-5C show conceptual illustrations of the properties of band 503 of a rubber-banding function that connects the spectator 400 to a target player 405, according to another embodiment. In FIG. 5A, the spectator 400 faces a northerly direction 500. The camera 401 similarly faces a northerly direction 501. Since player 405 is not directly in front of spectator 400, the band 503 curves in the north-easterly direction to connect with player 405. When spectator 400 turns to face player 405 to face direction 500', the player 405 then appears to be directly in front of spectator 405. As a result, the band 503' is displayed to be straight. When spectator 400 further turns the HMD 402 to the right to face the easterly direction 500", the band 503" emanates in the easterly direction before curving to the left to meet player 405.

Figure 6A:
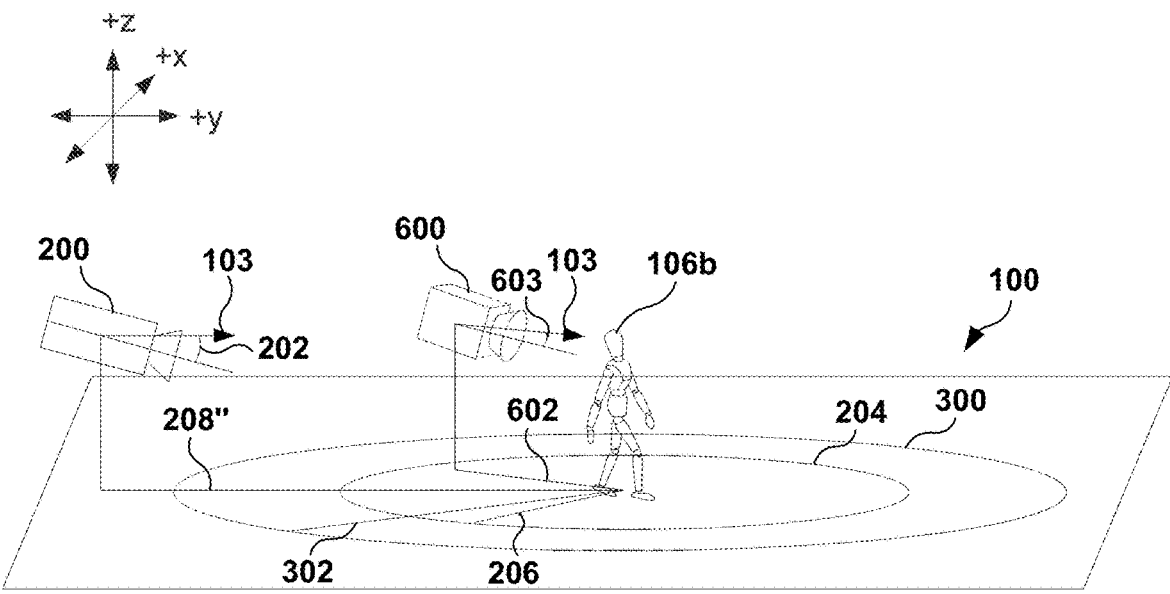
FIGS. 6A and 6B show a camera placement diagram and a resulting catch-up function, respectively, according to one embodiment.
Figure 6B:
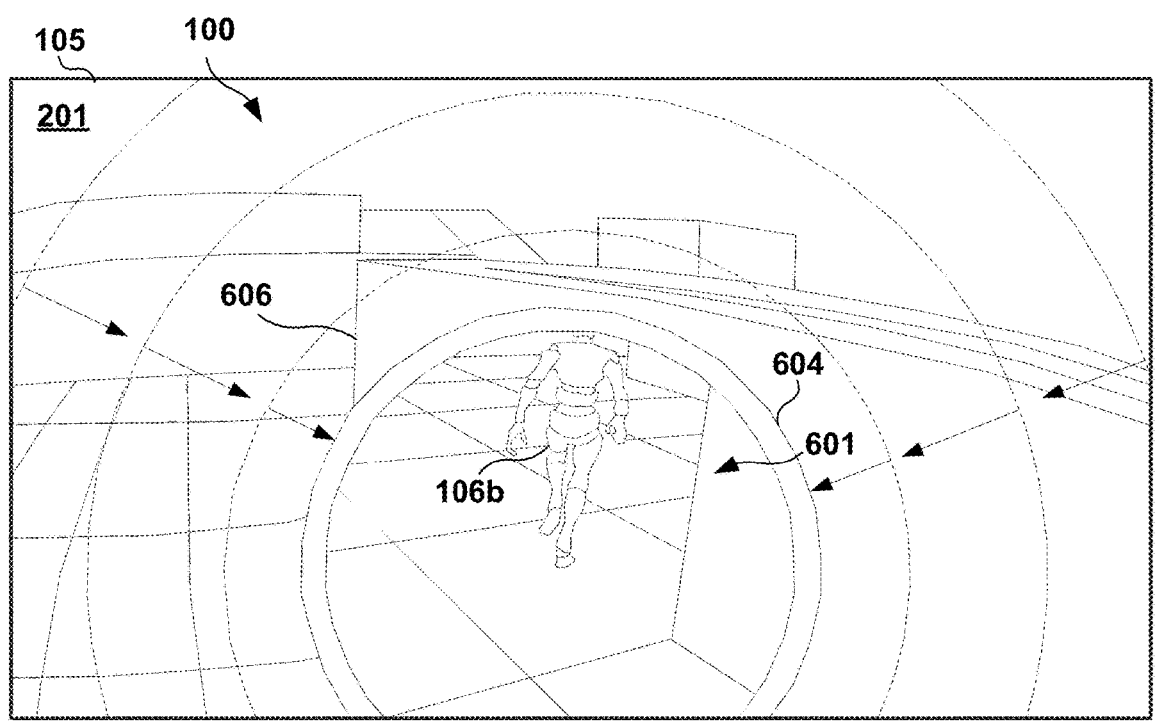

FIGS. 6A and 6B show a camera placement diagram and a resulting catch-up function, respectively, according to one embodiment. The catch-up function is triggered when the player 106b moves a certain distance away from the spectator or vice versa. During activation of the rubber-banding function, the spectator is given an opportunity to manually catch up to the player 106b as long as the distance between the spectator and the player 106b is less than radius 302. As such, the spectator may use the band of the rubber-banding function as a guide to navigate the interactive environment 100 to catch up to the player 106b. There are instances in which the distance between the spectator and the player 106b grows greater than radius 502. This may occur, for example, if the spectator chooses not to continuously follow the player 106b, if it becomes difficult for the spectator to follow the player 106b, or if the player 106b teleports to another location within the interactive environment 100. A follow-assist function termed the catch-up function is triggered in these instances that enables the spectator to catch-up to the player 106b. The catch-up function is mediated through one or more portals to translocate, move, or pull the spectator toward the player 106b. That is, the catch-up function changes the virtual position of the spectator within the interactive environment 100.

The portals and portal views enable such translocation, movement, and pulling within the interactive environment while minimizing visual discomfort and disorientation that may be associated with translational movement of a VR scene, especially when the translational movement is not the result of the spectator's agency. For example, it has been observed that when an HMD user is presented a rapidly moving VR scene that they are not in control of, a sense of spatial grounding and orientation may be disrupted. The portal-mediated catch-up function has been demonstrated to reduce disorientation, dizziness, lack of spatial grounding, and visual discomfort while also being able to move the vantage point and location of the spectator rapidly to bring the spectator closer to player 106b.

In FIG. 6A, camera 200 used to capture the third-person view 401 is shown to be a distance 208" away from the player 106b. Distance 208" is greater than distance 208' due to the player 106b moving away from the spectator, the spectator moving away from the player 106b, or both. Distance 208" is also greater than radius 302, which defines the circular outer boundary 300. When distance 208" exceeds radius 302 (e.g., when the vantage point of camera 200 is outside of boundary 300), the catch-up function is triggered. The catch-up function causes an additional camera 600 to be provisioned for capturing the portal view 601 that mediates the catch-up function. In various embodiments, the camera 600 is initially introduced at the same vantage point as camera 200 and is moved in the direction of the player 106*b*. FIG. 6A shows that camera 600 has already been moved to achieve a distance 602 away from the player 106*b*, which is less than either of radius 206 and radius 302. The movement of camera 600 is described in greater detail with respect to FIGS. 8A-8H.

The pitch 603 of camera 600 used for capturing the portal view 601 may be the same as or different from the pitch 202. In some embodiments, the pitch 603 matches the real-world pitch of the HMD of the spectator such that when the portal view 601 expands into a full third-person view after completion of the catch-up function, the camera pitch of the full third-person view matches the real-world pitch of the HMD. In other embodiments, the pitch 603 may be initially different from pitch 202, which matches the real-world pitch of the HMD. During the course of the catch-up function, the pitch 603 is adjusted by a pitch-matching function so that the pitch 603 matches the real-world pitch of the HMD once the portal 604 is wiped away for the new third-person view.

FIG. 6B shows an illustration of the catch-up function corresponding to the diagram of FIG. 6A, according to one embodiment. When the catch-up function is triggered, a portal 604 displaying the portal view 601 captured by camera 600 is generated. The portal 604 may first appear as a result of a field of view constriction animation. For example, the portal 604 may first appear larger and exceeding the bounds of the interface 105 before shrinking to the size of the portal 604. In FIG. 6B, the dashed lines and arrows represent how the portal 604 starts out larger and shrinks in size. In this fashion, the spectator's gaze is drawn to or focused on the contents of the portal view 601. The final state of the portal 604 may be termed the foveated state. The portal 604 may be highlighted and/or color-coded according to a color of the player 106*b*.

The third-person view 201 that is outside of the portal 604 remains visible to the spectator. The portal view 601 changes in perspective because camera 600 is configured to follow player 106*b*. On the other hand, the third-person view 201 may be limited from movement or frozen entirely so that the appearance of movement is confined to the portal view 601. This reduces the likelihood and extent of disorientation because the appearance of movement is restricted to a region of the interface (e.g., the portal 604) where the spectator's attention has been focused (e.g., via the field of view constriction animation). As a result, the appearance of movement is directed at the spectator's foveal vision and reduced in the spectator's peripheral vision. This is contemplated to reduce the sensation of motion sickness, dizziness, disorientation, and discomfort that may be attendant to displaying movement to the entire field of view. In some embodiments, the third-person view 201 that is outside of the portal view 601 may be blurred or made opaque to further guide the spectator's foveal vision toward the portal view 601 and reduce the appearance of movement in the spectator's peripheral vision.

The portal view 601 gives the spectator an opportunity to familiarize themselves with a new vantage point and perspective and reground their spatial awareness with respect to player 106*b*. For example, the vantage point of the third-person view 201 is before rounding corner 606 whereas the vantage point of the portal view 601 is subsequent to rounding corner 606. Further, the perspective of portal view 601 is different from that of the third-person view 201. The new vantage point and perspective take some time for the mind of the spectator to process, and, as a result, the portal view 601 is contemplated to remain in the foveated state for a period before the portal 604 expands into a new third-person view.

In various embodiments, the audio that the spectator hears during the catch-up function may be that associated with the portal view 601. For example, if player 106*b* is relatively far away, the spectator may be selectively provided audio that is associated with player 106*b* and its surroundings that appear to sound relatively closer than the player 106*b* is to the spectator. In certain embodiments, the audio associated with the portal view 601 may be processed with a Doppler shift to simulate fast travel of the portal 604.

In some embodiments, the portal view 601 appears as a two-dimensional or flattened view to the spectator while the third-person view 201 appears as a three-dimensional view. It has been observed that splitting the interface 105 into two different three-dimensional views (e.g., within the portal view 601 and within the third-person view 201) in VR may cause some level of visual strain. Additionally, splitting the interface 105 into two different three-dimensional views in VR may also result in optical illusions or the appearance of "impossible things" such as a more distant object clipping or occluding from view a closer object. As a result, portal view 601 may be displayed within the HMD as a two-dimensional view until the portal view 601 becomes a new third-person view after wiping away the portal as discussed below. Moreover, the portal view 601 may be "billboarded" such that the portal view 601 always faces the spectator. In various embodiments, the video images displayed for the portal view 601 are created by cropping images generated by camera 600.

In various embodiments, the portal view 601 and the portal 604 may appear as an entity floating in three-dimensional space. For example, in some embodiments, the portal view 601 and portal 604 may be far enough from the spectator to appear like a user interface (UI) element placed at practically infinite depth where there are no noticeable parallax effects. While the portal view 601 and the portal 604 are billboarded and thus always face the spectator, they may nevertheless move within the interface 105. In certain embodiments, the portal 604 is placed at a location within the interface 105 that corresponds to the direction of the player 106. For example, in FIG. 6B, the portal 604 may be placed a bottom-center location because the player 106*b* would occupy a bottom-center location in the interface if the player 106*b* were closer to the spectator. This directional correspondence is referred to as lock-on field of view restriction because the portal 604 effectively locks onto the target player 106*b* similar to how a reticle or cross-hairs lock onto a target in certain aiming games. In this manner, the portal 604 is not restricted to the center of the interface 105 but instead tracks the location of the player 106*b* relative to the spectator.

Figure 7A:
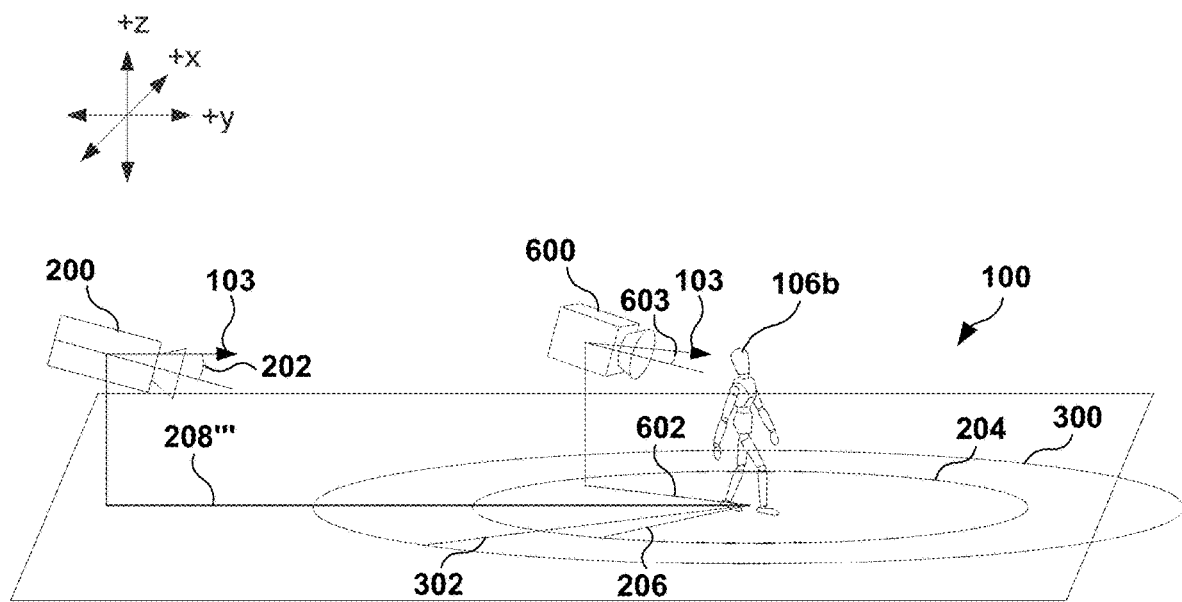
FIGS. 7A and 7B show a camera placement diagram and a resulting view towards the tail-end of the catch-up function, respectively, according to one embodiment.
Figure 7B:
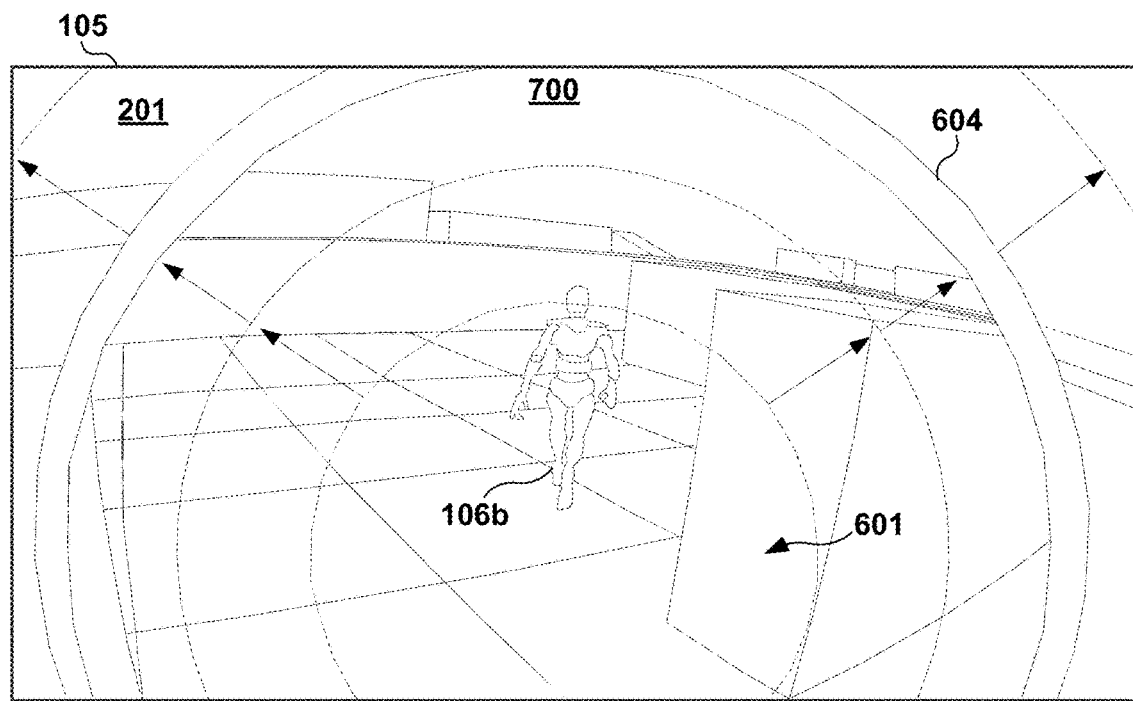

FIGS. 7A and 7B show a camera placement diagram and a resulting view towards the tail-end of the catch-up function, respectively, according to one embodiment. In FIG. 7A, player 106*b* has traveled in the +y direction from what is shown in FIG. 6A. As a result, distance 208''' has increased because camera 200 does not follow player 106*b*. On the other hand, distance 602 remains the same because camera 600 has followed player 106*b* throughout the movement in the +y direction. After a period of the portal 604 remaining the foveated state, the portal 604 is wiped away by expanding in size until it is so large as to be outside of the spectator's field of view. When the portal 604 is wiped away, the portal view 601 is simply a new third-person view 700 and replaces the now pervious third-person view 201. That is, when the portal 604 is wiped away, the camera 600 used to capture the portal view 601 is then used to capture the new third-person view 700. In this fashion, the vantage point of the spectator is brought closer to the player 106*b*. For example, the spectator is essentially teleported to a new virtual position corresponding to the vantage point of camera 600 from a previous location corresponding to the vantage point of camera 200.

FIG. 7B shows an embodiment of the portal 604 being wiped away. In particular, the previous third-person view 201 is being replaced by the new third-person view 700. The dashed lines and arrow in FIG. 7B represent the animation of wiping away the portal 604. While the portal 604 is being wiped away, the player 106*b* may still be in movement. In some embodiments, the vantage point of camera 600 continues to automatically follow the player 106*b* during at least a portion of wiping away of the portal 604. For example, the vantage point of the camera 600 may cease to automatically follow player 106*b* once the portal 604 has been completely wiped away, or it may cease to automatically follow player 106*b* after the portal 604 achieves a certain size when expanding the portal 604.

In some embodiments, the rubber-banding function will be automatically retriggered during or after the wiping away of the portal 604. This may be the case when automatic catch-ups are enabled so as to show who and where the "catch-up" target is. There are at least two modalities in which automatic catch-ups may be enabled. In one embodiment, the automatic catch-ups are enabled by using and entering into a magnifying window from an overhead view. In another embodiment, the automatic catch-ups are enabled when a spectator "consumes" a player portal from an interactable map view. When automatic catch-ups are enabled, the rubber-banding function may be continuously rendered to apprise the spectator of where the target is located after each of the automated catch-ups.

In some embodiments, the view within the expanding portal 604 may transition from a two-dimensional view to a three-dimensional view while the portal 604 is being wiped away or after the portal 604 is wiped away. The user may experience a sense of "three-dimensional pop" that results from a three-dimensional view of content that was previously presented in two-dimensions.

Another function that may be executed during the wiping away of the portal 604 is a zooming function that places the spectator closer to the target player 106*b*. Because the size of the portal 604 is smaller than the interface 105, the camera 600 must maintain some distance away from the player 106*b* in order to fully or nearly fully show the player 106*b* within the portal 604. If the camera 600 is too close to the player 106*b*, the player 106*b* will only be partially visible to the spectator when the images are cropped to fit the smaller screen area of the portal 604. However, when the portal 604 is wiped away, the distance between camera 600 may be greater than necessary to achieve a full view of the player 106*b* within the interface, since the interface 106*b* is larger than the portal 604. As a result, the player 106*b* may appear relatively distant.

The zooming function moves the camera 600 in the direction that the spectator is facing while wearing the HMD, which is presumably toward the target player 106*b*. The practical effect of the zooming function is to bring the vantage point of the spectator closer to the player 106*b*. In this manner, the player 106*b* occupies a larger amount of space within the interface 105 than it would have if the portal 604 were wiped away without further moving the camera 600 for the zooming function. In addition to getting pulled closer to the player 106*b*, the zooming function also gives the impression of being sucked into the new third-person view 700.

In various embodiments, certain rules may be implemented with respect to the catch-up function. Generally, the catch-up function will be triggered when the distance between the spectator is beyond a certain amount. An example of this threshold distance is represented as the distance of radius 302. In one embodiment, the system executing the spectating interface 105 will enforce a cool-down time between sequential catch-ups to prevent rapid catch-up function triggering. In other embodiments, the system will be sensitive to player occlusion scenarios when an obstacle or object occludes the player from view. In these scenarios, the system may ignore the distance requirement and use a smaller cool-down time in order to prioritize catching up to the player when the player is blocked from view. In other embodiments, the catch-up function may not be triggered if the spectator the spectator is not roughly looking at the player, e.g., within a 35° angular error. In these embodiments, the spectator is given the opportunity to freely examine the surrounding environment without being disrupted by an automated catch-up when the player is not the primary focus of the spectator. In other embodiments, the catch-up function will not be triggered when the spectator has selected the interactable map view, which is a view having a map of the interactive environment and a plurality of individual player portal views of the plurality of players.

In other embodiments, a "portal wipe" will be substituted for a portal-mediate catch-up function. A portal wipe is desirable when a sudden change of perspective or vantage point is required. The portal wipe may be characterized as a scene change effect because of its ability to mediate change of scenes with differing vantage points. The portal wipe includes an animation having a portal appear at the center of the field of view (e.g., starting with a very small or zero radius) and expanding gradually. The new scene appears within the portal and when the portal expands beyond the field of view, the new scene replaces the previous scene. The reverse of this animation is also possible. The spectator is therefore teleported from the vantage point of the prior scene to that of the new scene.

Typically, a spectator will have a default forward-facing direction, which may be the direction they face when first putting on the HMD, or it may be the direction they face naturally when seated, or the direction facing a camera that tracks the HMD and the spectator. In case the angle between the spectator's default forward-facing direction and the direction towards the target player is more than, for example, 70°, the spectator is no longer facing the general direction of the target player. In these instances, a portal wipe instead of a catch-up function may be triggered. This may be so because the lock-on field of view restriction is less appropriate because the target player is not within the field of view of the spectator. Further, the portal wipe relieves the need for the spectator to turn around to face the target player.

In some embodiments, the system will prioritize re-centering the spectator toward the default forward-facing direction over either a portal wipe or a catch-up function. This is especially true when the spectator is turned toward the opposite direction of the default forward-facing direction (e.g., 180° away from the forward-facing direction). If the spectator is facing away from the forward-facing direction but the target player is in the forward-facing direction (e.g., the target player is behind the spectator), the system may wait for the spectator to turn toward the forward-facing direction to face the target player. Once the player does so and fixates on the target player, the catch-up function will then be executed to catch the spectator up to the target player.

Figure 8A:
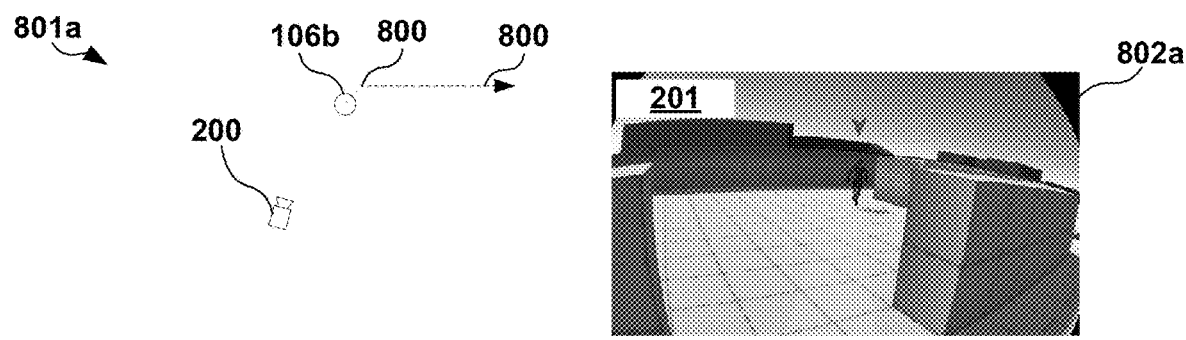
FIGS. 8A-8H show a sequence of events occurring during a catch-up function, according to one embodiment.
Figure 8B:
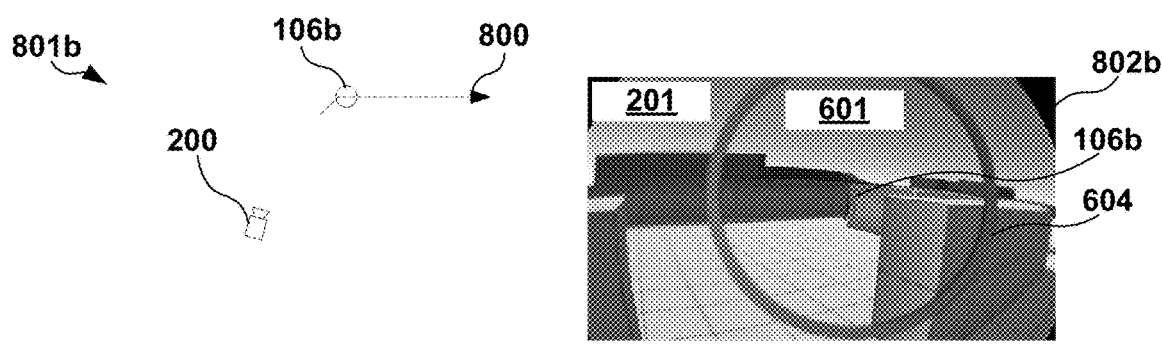

FIGS. 8A-8H show a sequence of camera placement diagrams 801a-801h and snapshots 802a-802h representing the events of a catch-up function, according to one embodiment. In FIG. 8A, the camera 200 captures a third-person view 201 of player 106b as the player moves along path 800. The rubber-banding function places a band that connects the spectator to the player 106b, as shown in snapshot 802a. During the period between FIGS. 8B and 8A, the player 106b has continued on path 800 so that the distance separating it from the spectator has increased. Additionally, the player 106b has rounded a corner, which partially occludes the player 106b from view. In FIG. 8B, the catch-up function has been triggered as a result of either the increased distance or the occlusion. In snapshot 802b, the catch-up function begins with a field of view constriction animation where the portal 604 appears from outside of the field of view and shrinks down to a foveated state. Note that the field of view constriction of the portal 604 is centered around the player 106b, which is not necessarily in the center of the interface. The portal 604 also has lock-on field of view restriction features, in which the portal 604 continues to be centered around the player 106b when either the player 106b moves or the spectator changes their perspective by rotating the HMD.

In the embodiment shown in FIG. 8B, the field of view constriction is performed on video images captured by camera 200. Namely, the video images captured by camera 200 is used for both the content inside the portal 604 as it is being constricted as well as the content outside of portal 604 (e.g., the third-person view 201). In other embodiments, a second camera (e.g., camera 600) may be provisioned during the step of the field of view constriction such that the content of the portal 604 during constriction has already begun to follow the player 106b. A blurring process for the third-person view 201 that is outside of the portal 604 is also shown to have begun.

Figure 8C:
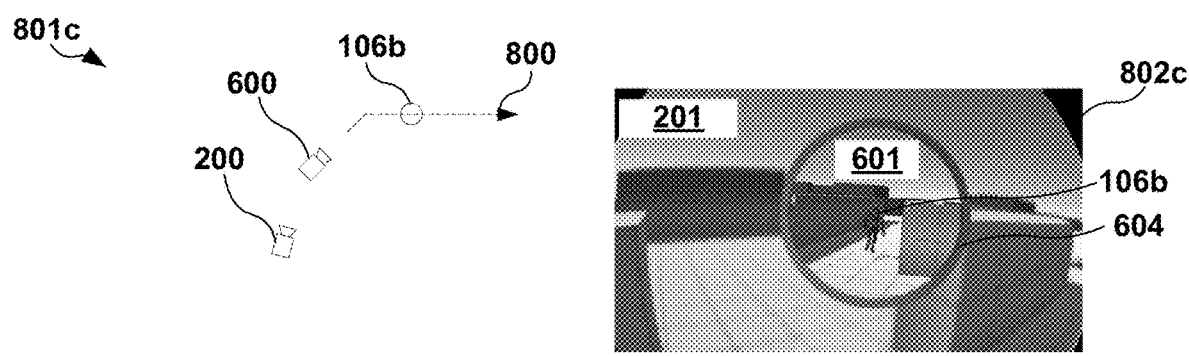

In FIG. 8C, the portal view camera 600 has been provisioned and begins to follow the player 106b as the player moves further along path 800. Camera 200 remains at the same vantage point as before. In snapshot 802c, the field of view constriction has completed and the portal 604 has achieved a foveated state. The portal view 601 captured by camera 600 is displayed within portal 604. In the embodiment shown, the portal view camera 600 is provisioned once the field of view constriction process is completed, although other embodiments are also contemplated. When the portal view camera 600 is provisioned, it may have a vantage point and an orientation that matches that of camera 200. As a result, there is a seamless transition between the content of the portal 604 prior to the field of view constriction completing and the portal view 601. Once camera 600 is provisioned, it is accelerated in the direction of the player 106b to close the distance with the player 106b.

Figure 8D:
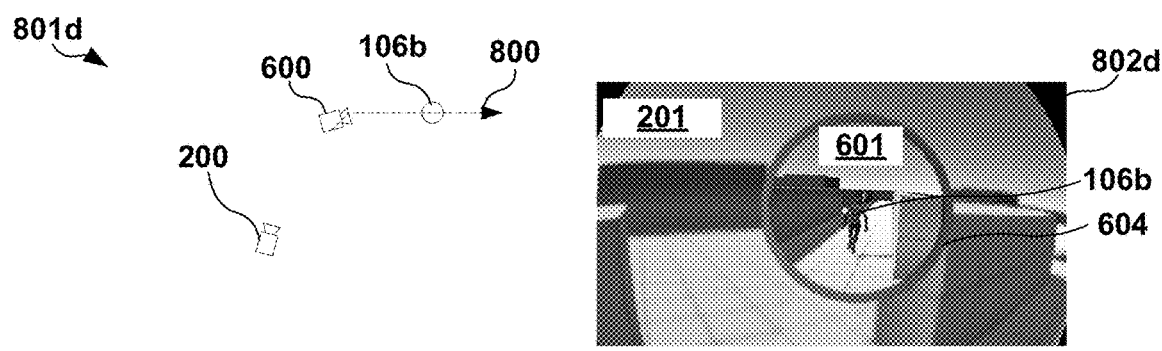
Figure 8E:
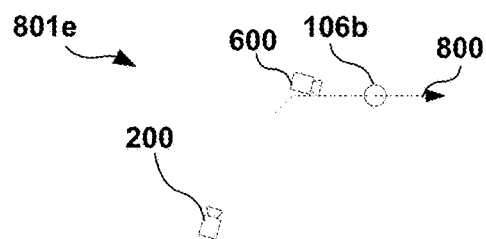
Figure 8E:
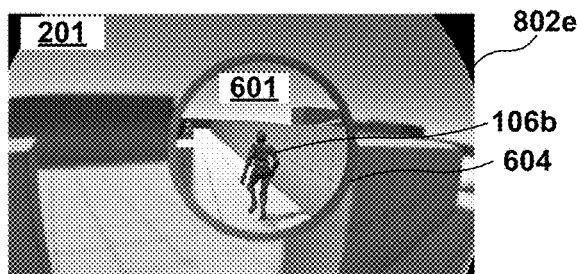
Figure 8F:
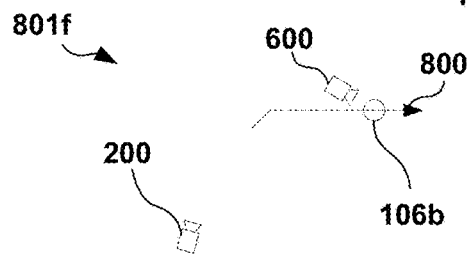
Figure 8F:
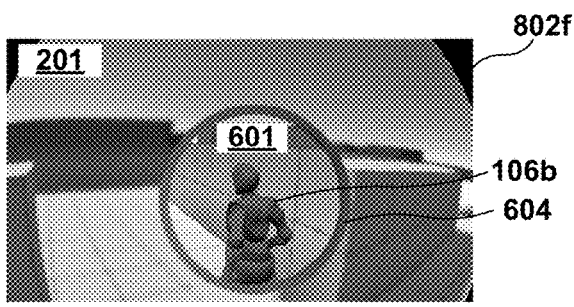

In FIG. 8D, camera 600 continues to close the distance as the player 106b continues on path 800. As a result, the speed of the camera 600 is faster than that of the player 106b for some portion of the catch-up function. In FIGS. 8E and 8F, the camera 600 continues to catch-up to the player 106b. Additionally, in the period between FIGS. 8E and 8F, the zooming function discussed above may have further brought the camera 600 closer to the player 106b. In the embodiment shown, the camera 600 is placed close enough to player 106b such that when the portal 604 is wiped away the player 106b appears close to the spectator. For example, in snapshot 802e the player 106b appears to be fully viewable within the portal view 601. That is, the player 106b is viewable in its entirety along with some of its surroundings. However, if the portal 604 is wiped away in snapshot 802e, the player 106b will appear relatively distant in a full third-person view. To counteract this effect, the camera 600 may be brought closer to player 106b such that the player 106b is not fully viewable within the portal view 601. For example, in snapshot 802, the camera 600 is close enough to player 106b that the player 106b is not fully visible (e.g., only the upper half of player 106b is within view). However, once the portal 604 is wiped away, the player 106b again becomes fully within view.

Figure 8G:
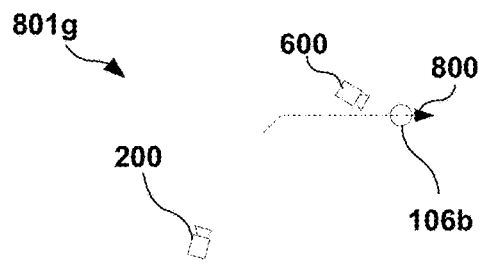
Figure 8G:
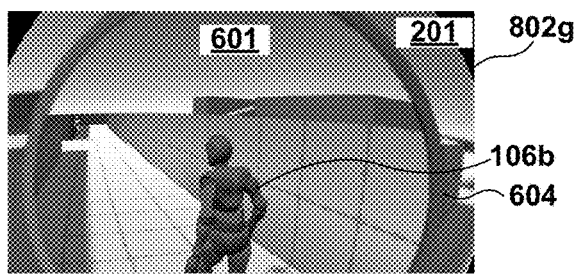

In FIG. 8G, the portal 604 is being wiped away with the portal expanding in size in snapshot 802g. As a result, the portal view 601 replaces the previous third-person view 201. In various embodiments, the camera 600 ceases movement before, during, or after the wiping away process of portal 604. In certain embodiments, the camera 600 continues to move while the portal 604 is expanding for the wiping away process, which may give to the spectator the appearance of being pulled into the new third-person view 700.

Figure 8H:
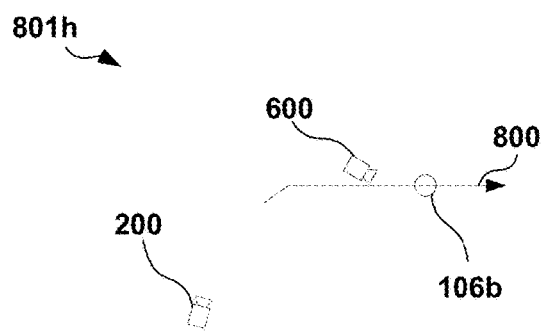
Figure 8H:
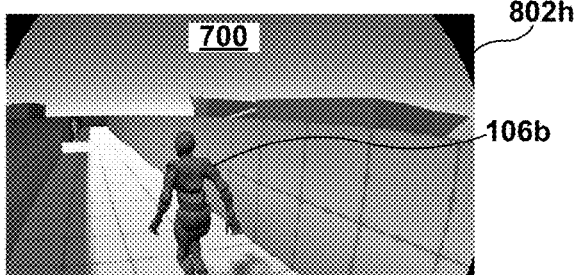
Figure 9A:
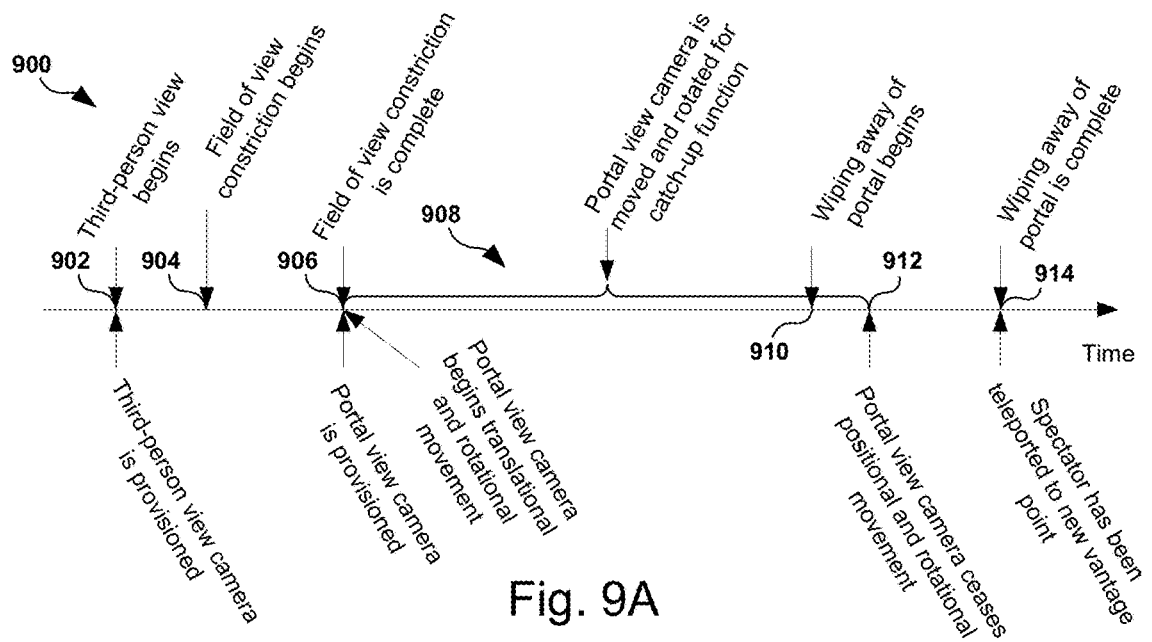
FIGS. 9A-9D show a timeline of events attendant to the catch-up function transporting the spectator, according to one embodiment.
Figure 9B:
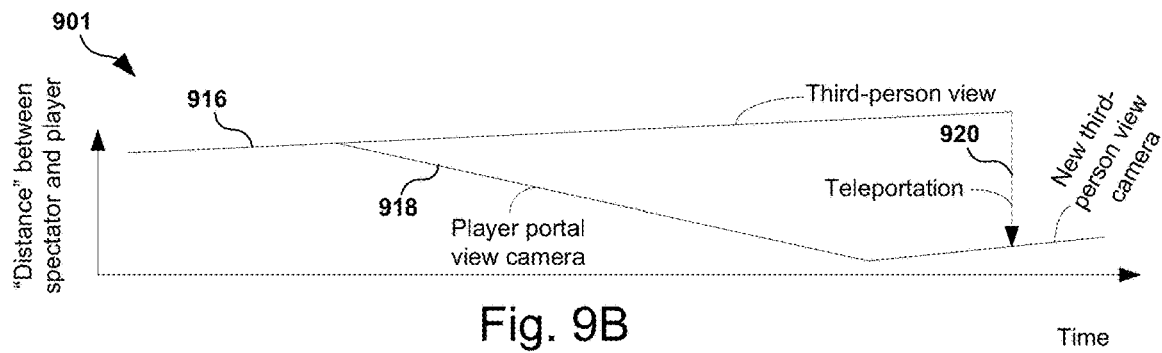
Figure 9C:
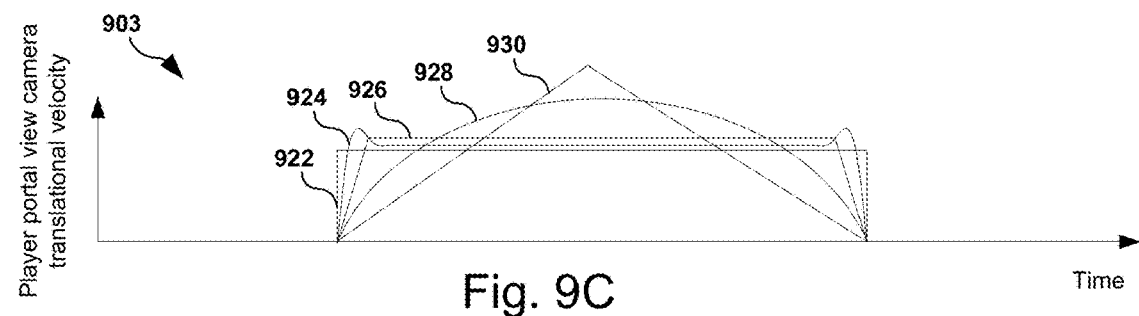
Figure 9D:
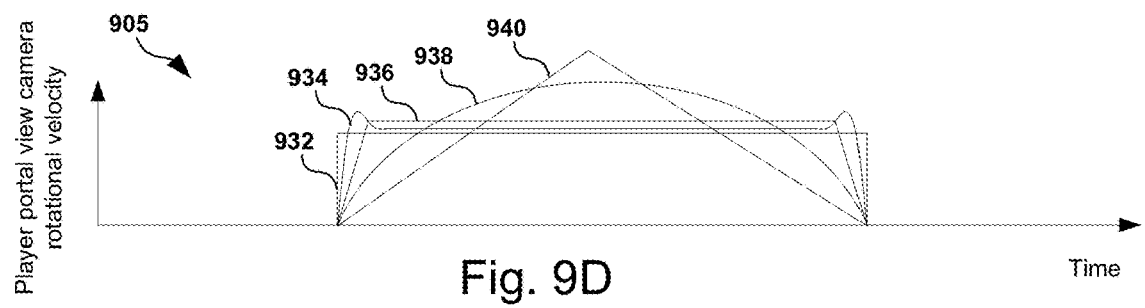

In FIG. 8H, the portal 604 has been completely wiped away and is no longer in view. Likewise, the portal view 601 has entirely replaced the now previous third-person view 201 and becomes a new third-person view 700. Since the portal 604 has been completely wiped away, camera 600 no longer automatically follows the player 106b but is instead back within the manual control of the spectator. If the player 106b happens to again moves a certain distance away from the spectator (or if the player 106b is occluded from view), the catch-up function will again be triggered. The catch-up function will thus continually pull the spectator closer to the player 106b as the player 106b moves about the interactive environment.

In addition to translational movement, the camera 600 also experiences rotation. For example, camera 600 is shown to have been rotated some 90° or more in the clockwise direction. Some of this rotation is the result of following the player 106b from behind the player as the player 106b makes a roughly 45° turn to the right to round corner 801. The remaining rotation may be the result of applying a yaw-correction function, which will be discussed in detail with respect to FIGS. 10A-10C and FIGS. 11A-11C.

FIGS. 9A-9D show a timeline of events attendant to the catch-up function transporting the spectator, according to one embodiment. Timeline 900 shows a contemplated sequence of events occurring before, during, and after a spectator has entered into a portal view to achieve a new third-person view. Graph 901 plots a distance between a vantage point of the spectator and that of the player against timeline 900, while graph 903 plots the translational velocity of the portal view camera against timeline 900 and graph 905 plots the rotational velocity of the portal view camera against timeline 900. Graph 901 assumes the player continues to move away from the vantage point of the original third-person view at a constant rate (e.g., in a straight line).

At time 902 on timeline 900, the third-person view begins when the third-person view camera is provisioned. Between time 902 and time 904, the catch-up function is triggered, for example, when the player moves beyond a certain distance from the spectator or when an object occludes the player from view. At time 904, the field of view constriction begins such that a shrinking portal appears. The third-person view that is outside of the portal may be blurred. At time 906, the field of view constriction is complete and the portal reaches the foveated state. Also at time 906 the portal view camera is provisioned to capture the portal view that catches up to the player. The portal view camera begins translational and rotational movement once the field of view constriction is complete. However, as noted above, the provisioning of the portal view camera and its movement may occur prior to the completion of the field of view constriction, e.g., before time 906.

During period 908, the portal view camera is moved and rotated for the catch-up function. The zoom function, which may be a feature of the catch-up function or a separate feature occurring after the catch-up function may also be executed during period 908. The portal view camera moves from the vantage point of the third-person view camera toward the player. If the player makes any turns while moving, the portal view camera correspondingly moves and rotates to remain behind the player. Additionally, the yaw-correction function may provide additional rotation to the portal view camera. At time 910, the portal view camera has generally caught up with the player. Thus, the portal begins to be wiped away. However, while the portal is being wiped away, the portal view camera may continue to be provided with translational and rotational movement until time 912 when they cease. In other embodiments, the portal view camera may cease positional and rotational movement at any point between time 910 and 914. At time 914, the wiping away of the portal is complete. As a result, what was the portal view has now been expanded to fill the interface to become the new third-person view.

Graph 901 shows plots 916 and 918 of distances separating the original third-person view camera and the portal view camera, respectively, from the player along the timeline 900. Graph 900 assumes that the player is moving away from the spectator at a constant rate and that the spectator does not manually catch-up to the player. Thus, plot 916 shows that the distance between the player and the original third-person camera experiences a steady increase between time 902 and time 914. At time 914 when the portal is wiped away, the new third-person view replaces the original third-person view, and so plot 916 ends at time 914. Plot 918 illustrates that the distance between the portal view camera and the player is decreased at a relatively constant rate during period 908. That is, the portal view camera is moved at a consistent speed while catching up the player. At time 912, the distance between the portal view camera and the player reaches a minimum before beginning to increase again after the portal view camera ceases translational movement. That is, the player starts to move away from the spectator at time 912. At time 914, the spectator is said to have completed a teleportation 920 from the distance of plot 916 to the distance of plot 918 at time 914 when the portal is completely wiped away.

Graph 903 plots the translational velocity of the portal view camera against timeline 900. In some embodiments, the translational velocity of the portal view during period 908 is constant or relatively constant as shown in plots 922, 924, and 926. In other embodiments, the translational velocity may be non-constant as show in plots 928 and 930. Other translational velocities may also be utilized with embodiments described here.

Graph 905 plots the rotational velocity of the portal view camera against timeline 1100. The rotational velocity refers to the speed at which the portal view camera is rotated about the yaw axis for yaw-correction (e.g., re-centering the spectator's head and HMD) or for following from behind a player when the player turns. The rotational velocity may also refer to the speed at which the portal camera is rotated for pitch-matching and roll-matching functions as well. In some embodiments, the rotational velocity of the portal view is constant or relatively constant as shown in plots 932, 934, and 936. In other embodiments, the rotational velocity may be non-constant as show in plots 938 and 940. Other rotational velocities may also be utilized with embodiments described here.

Figure 10A:
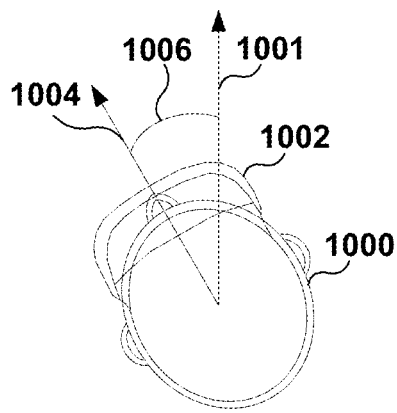
FIGS. 10A-10C illustrate a yaw-correction function that may be executed during execution of the catch-up function, according to various embodiments.
Figure 10A:
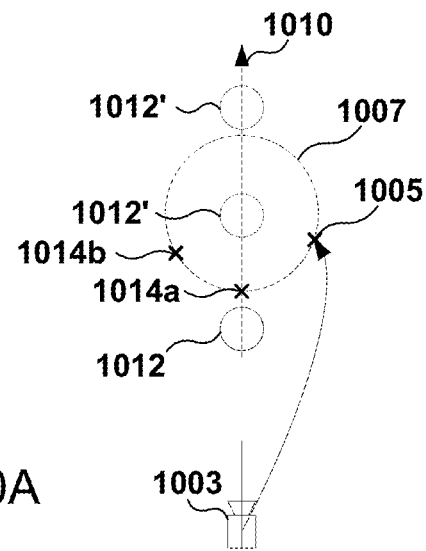
Figure 10B:
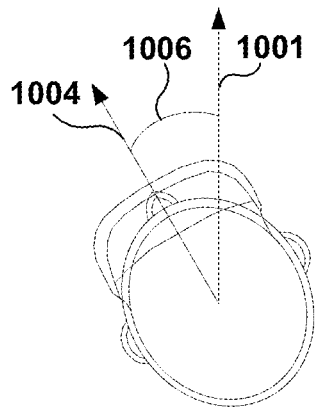
Figure 10B:
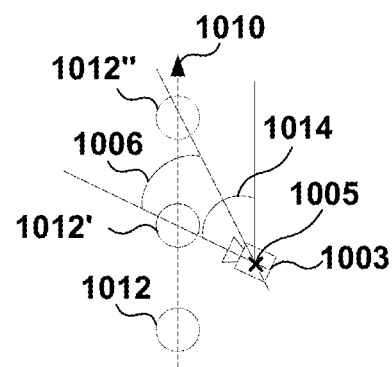
Figure 10C:
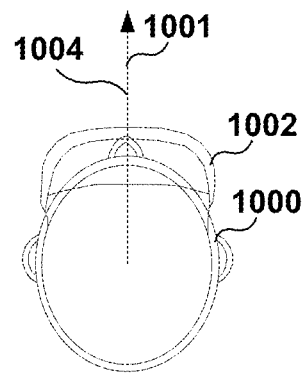
Figure 10C:
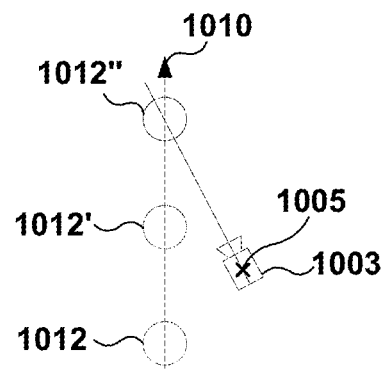

FIGS. 10A-10C illustrate a yaw-correction function that may be executed during execution of the catch-up function, according to various embodiments. When wearing an HMD 1002, a spectator 1000 typically has a default forward direction 1001 when spectating the interactive environment. The forward direction 1001 may correspond to a direction that faces a camera that tracks the HMD. In other embodiments, the default forward direction 1000 may be defined by a direction the spectator 1000 faces when sitting on a chair or on a couch. Oftentimes, the VR environments will encourage the spectator 1000 to turn their head toward the left or right (e.g., about the yaw axis). Sometimes it can be straining or tiring to consistently have the spectator 1000 turn their head in one direction to follow the action of the game. The yaw-correction function is contemplated to re-center the head of the spectator 1000 during the processes of catching up to the player via the catch-up function. More particularly, the yaw-correction function identifies a destination vantage point and orientation for placing the camera that allows the spectator 1000 to de-rotate their head by looking in the direction of the target player. The vantage point is calculated based on the target player's predicted near-term path in the environment along with the head rotation that is expected of the spectator 1000 to follow the target player as the target player moves along the predicted near-term path.

In FIG. 10A, the spectator 1000, and by extension, the HMD 1002 are facing direction 1004 that is rotated by angle 1006 from the forward direction 1001. While the spectator 1000 is facing direction 1004, the catch-up function is executed. FIG. 10A shows a camera 1003 used to capture the portal view of the player at a current position 1012 just prior to being moved for the catch-up function. The player is predicted to follow path 1010 and to occupy positions 1012' and 1012" at future times. The catch-up function brings the camera 1003 within a certain distance from the player, for example, somewhere on the circle 1007. However, if camera 1003 is moved to vantage point 1014a, the spectator 1000 would have to maintain a head rotation of angle 1006 to effectively follow the player. If camera 1003 is moved to vantage point 1014b, the spectator 1000 would have to rotate their head even more to left to follow the player as the player moves to position 1012". Instead, if the camera 1003 is moved to vantage point 1005, the spectator 1004 would de-rotate their head while following the movement of the player from position 1012' to position 1012". The yaw-correction function finds destination vantage points such as vantage point 1005 that allows the spectator 1000 to de-rotate their head while following the player's future movements.

In FIG. 10B, the spectator 1000 is still facing direction 1004 that is rotated from forward direction 1001 by angle 1006. Meanwhile, however, camera 1003 has been moved to vantage point 1005 and has been rotated to the left by angle 1014. The placement and rotation allow the spectator 1000 to view the player head-on when the player is at position 1012', but also to de-rotate their head when the player moves to position 1012". Angle 1014 is calculated based on angle 1006 and based on the player's predicted near-term path 1010. For example, the yaw-correction function may determine that an angle 1014 results in a de-rotation to the right of angle 1006 when the spectator 1000 follows the player to position 1012".

In FIG. 10C, the player has moved to position 1012" and the spectator 1000 has followed the player to position 1012" with their head and gaze. As a result, the spectator 1000 is facing a direction 1004 that is now aligned with the forward direction 1001. Thus, the yaw-correction function has realigned or re-centered the head of the spectator 1000 to face the forward direction 1001 by identifying destination vantage point 1005 and rotation angle 1014 for the catch-up function.

Figure 11A:
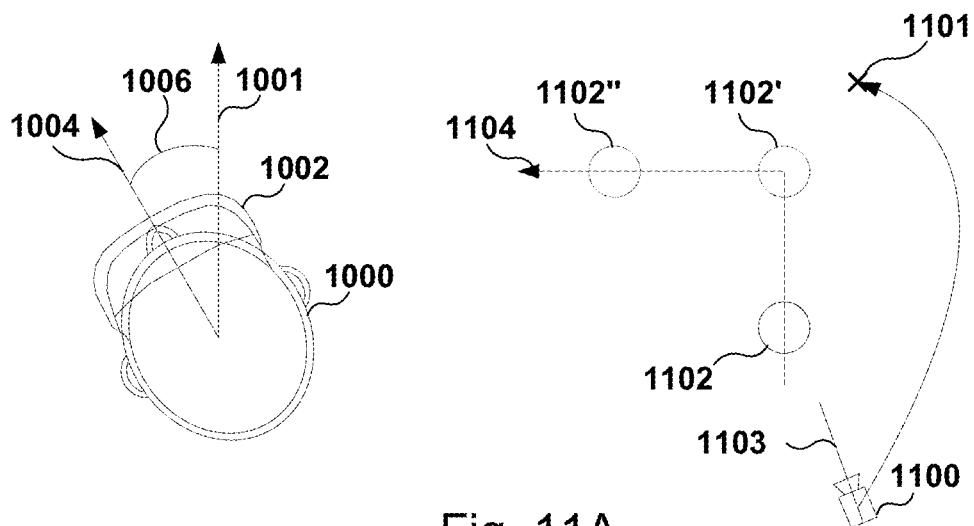
FIGS. 11A-11C illustrate a yaw-correction function that may be executed during execution of the catch-up function when the target player makes a turn, according to various embodiments.
Figure 11B:
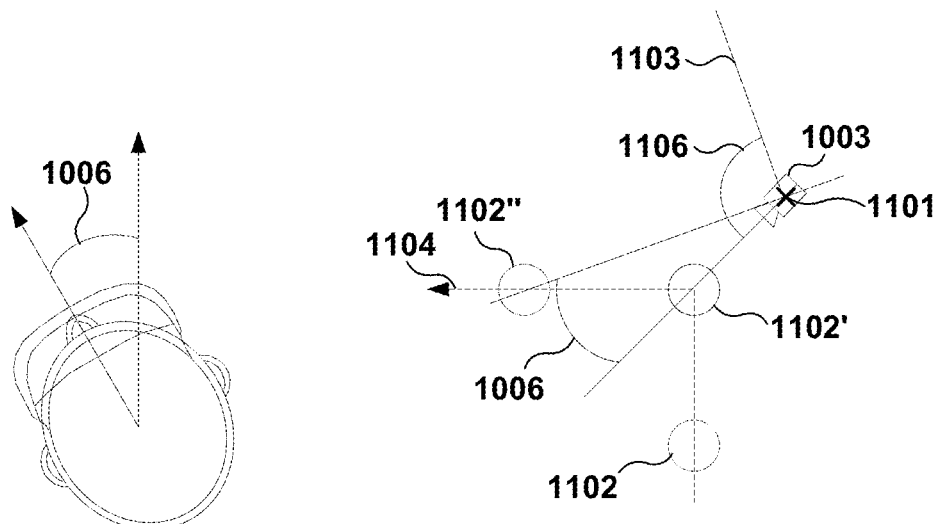
Figure 11C:
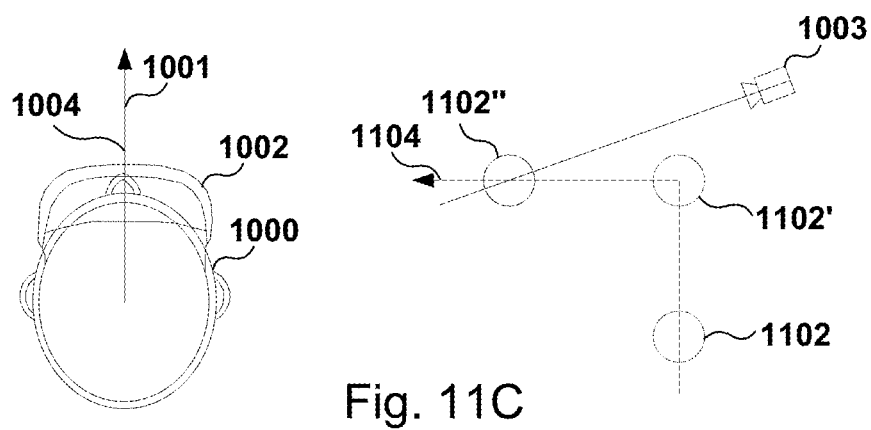

FIGS. 11A-11C illustrate a yaw-correction function that may be executed during execution of the catch-up function when the target player makes a turn, according to various embodiments. Similar to FIG. 10A, the spectator 1000 is facing direction 1004 that is rotated by angle 1006 from the forward direction 1001. While the spectator 1000 is facing direction 1004, the catch-up function is executed. In FIG. 11A, the camera 1100 points in direction 1103 to face the player at a current position 1102 prior to execution of the catch-up function. The player is predicted to occupy positions 1102' and 1102" at future times while traveling along predicted path 1104. The path includes a 90° turn to the left. FIG. 11A is not drawn to scale and camera 1110 may much farther away from the player at position 1102.

In FIG. 11B, the catch-up function along with the yaw-correction function has moved the camera 1100 to destination vantage point 1101. Additionally, the catch-up function and the yaw-correction function have rotated the camera 1100 by angle 1106 in the counter-clockwise direction. The camera 1100 was rotated by angle 1106 so that the spectator 1000 would de-rotate their head by angle 1006 in the clockwise direction simply by following the player to position 1102". FIG. 11C shows that the spectator has followed (e.g., turned their head to gaze at) the target player at position 1102". As a result, the spectator 1000 has de-rotated their head by angle 1006 so that the spectator 1000 now faces the forward direction 1001.

Figure 12:
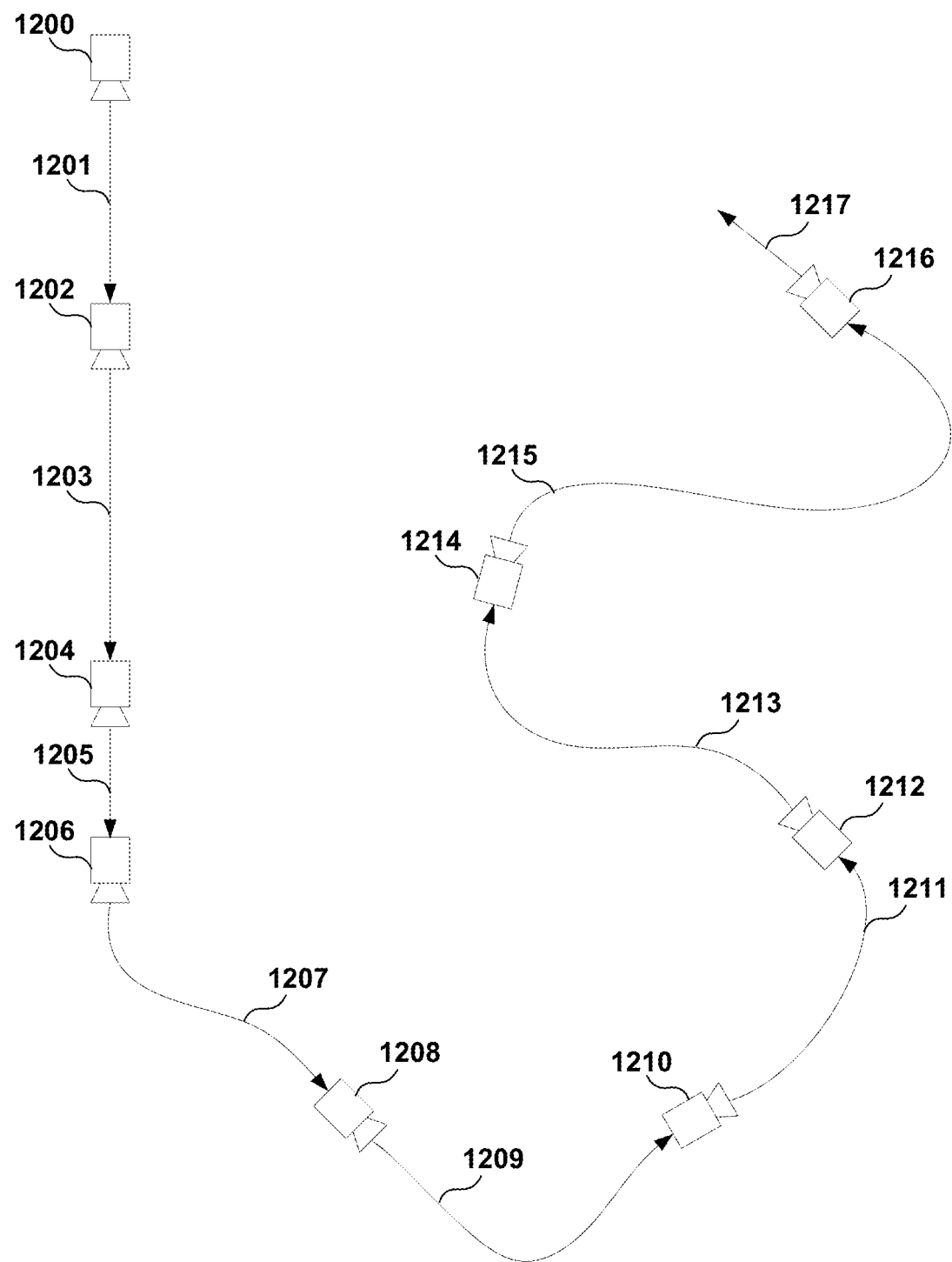
FIG. 12 shows a sequence of catch-up events for continually following a player, according to one embodiment.

FIG. 12 shows a sequence of catch-up events for continually following a player, according to one embodiment. The sequence of catch-ups involves a plurality of cameras 1200-1216 and respective plurality of catch-ups. The result of the sequence of catch-ups is that the spectator is continually pulled closer to the player (not shown) as the player moves about the interactive environment. As demonstrated by FIG. 12, some catch-ups may be longer or shorter than others. The distance covered by each catch-up will depend upon how the catch-up function is triggered and how fast the player is moving. Additionally, some catch-ups are shown to be linear while others follow curved paths.

Figure 13:
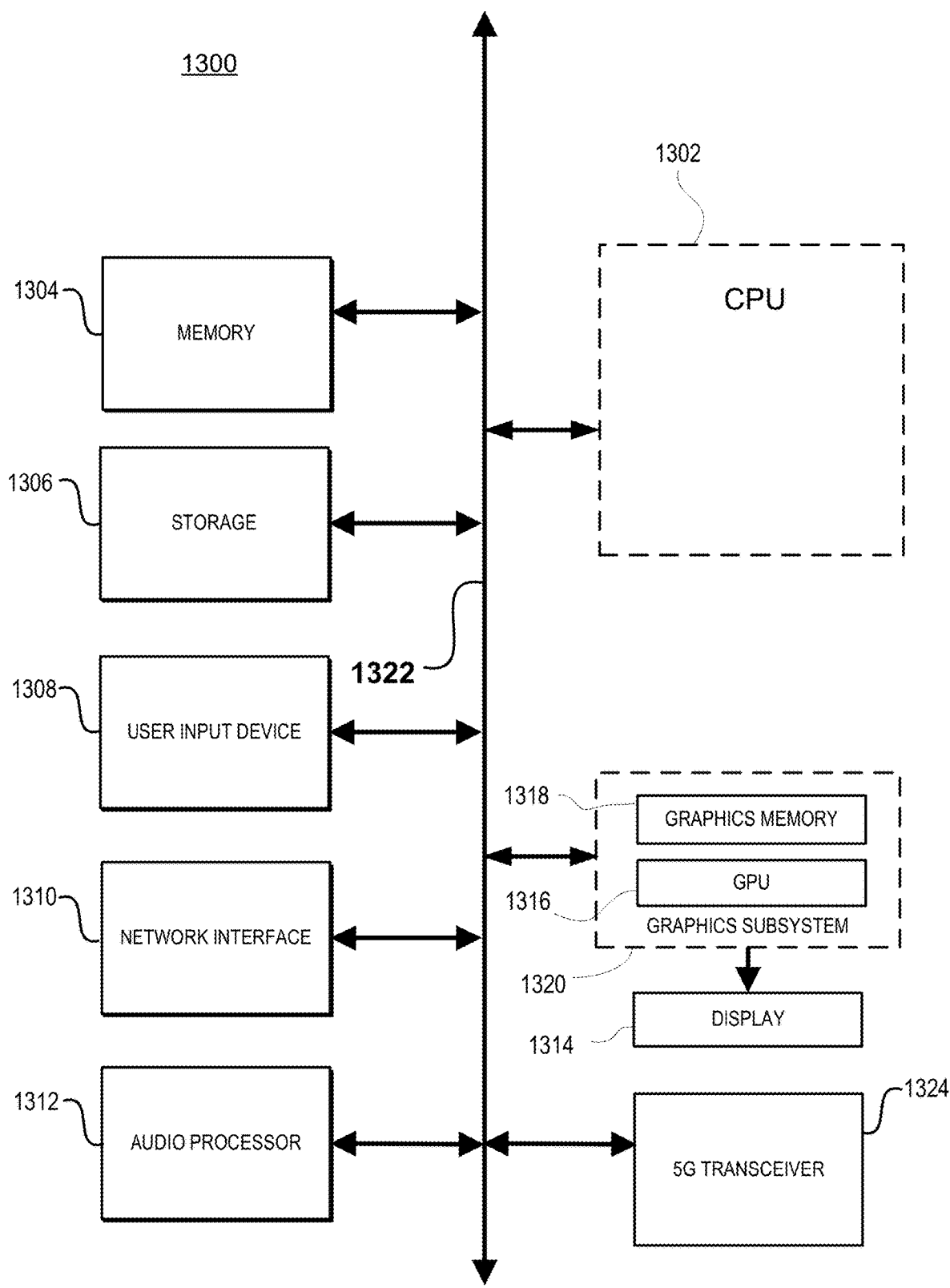
FIG. 13 illustrates components of an example device that can be used to perform aspects of the various embodiments of the present disclosure, according to various embodiments.

FIG. 13 illustrates components of an example device 1300 that can be used to perform aspects of the various embodiments of the present disclosure. This block diagram illustrates a device 1300 that can incorporate or can be a head mounted display, a personal computer, video game console, personal digital assistant, a server or other digital device, suitable for practicing an embodiment of the disclosure. Device 1300 includes a central processing unit (CPU) 1302 for running software applications and optionally an operating system. CPU 1302 may be comprised of one or more homogeneous or heterogeneous processing cores. For example, CPU 1302 is one or more general-purpose microprocessors having one or more processing cores. Further embodiments can be implemented using one or more CPUs with microprocessor architectures specifically adapted for highly parallel and computationally intensive applications, such as spectating platforms. Device 1300 may be a localized to a player playing a game segment (e.g., game console or HMD), or remote from the player (e.g., back-end server processor).

Memory 1304 stores applications and data for use by the CPU 1302. Storage 1306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1308 communicate user inputs from one or more users to device 1300, examples of which may include keyboards, mice, joysticks, touch pads, touch screens, still or video recorders/cameras, tracking devices for recognizing gestures, and/or microphones. Network interface 1310 allows device 1300 to communicate with other computer systems via an electronic communications network and may include wired or wireless communication over local area networks and wide area networks such as the internet. An audio processor 1312 is adapted to generate analog or digital audio output from instructions and/or data provided by the CPU 1302, memory 1304, and/or storage 1306. The components of device 1300, including CPU 1302, memory 1304, data storage 1306, user input devices 1308, network interface 1310, and audio processor 1312 are connected via one or more data buses 1322. 5G transceiver 1324 allows device 1300 to communicate with 5G digital cellular networks, which provide access to the internet and other networks.

A graphics subsystem 1320 is further connected with data bus 1322 and the components of the device 1300. The graphics subsystem 1320 includes a graphics processing unit (GPU) 1316 and graphics memory 1318. Graphics memory 1318 includes a display memory (e.g., a frame buffer) used for storing pixel data for each pixel of an output image. Graphics memory 1318 can be integrated in the same device as GPU 1316, connected as a separate device with GPU 1316, and/or implemented within memory 1304. Pixel data can be provided to graphics memory 1318 directly from the CPU 1302. Alternatively, CPU 1302 provides the GPU 1316 with data and/or instructions defining the desired output images, from which the GPU 1316 generates the pixel data of one or more output images. The data and/or instructions defining the desired output images can be stored in memory 1304 and/or graphics memory 1318. In an embodiment, the GPU 1316 includes 3D rendering capabilities for generating pixel data for output images from instructions and data defining the geometry, lighting, shading, texturing, motion, and/or camera parameters for a scene. The GPU 1316 can further include one or more programmable execution units capable of executing shader programs.

The graphics subsystem 1320 periodically outputs pixel data for an image from graphics memory 1318 to be displayed on display device 1314. Display device 1314 can be any device capable of displaying visual information in response to a signal from the device 1300, including CRT, LCD, plasma, and OLED displays. Device 1300 can provide the display device 1314 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

Most video games played over the Internet operate via a connection to the game server. Typically, games use a dedicated server application that collects data from players and distributes it to other players. Users access the remote services with client devices, which include at least a CPU, a display and I/O. The client device can be an HMD, PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via an HMD, a tablet computing device, a touch-screen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method of moving a view of a spectator within an environment of a video game, comprising:
   generating an interface for presenting a view of the video game to the spectator of the video game, the view having a first vantage point and includes a game object;
   providing a portal within the interface for presenting a second vantage point of the game object, the portal is overlaid to cover a portion of the view;
   moving the second vantage point closer toward the game object such that the view is brought closer to the game object within the portal, while the view remains at the first vantage point outside the portal;
   removing the portal during at least a portion of said moving the second vantage point; and
   providing a new portal within the interface when the game object moves a predetermined distance away from a virtual position of the spectator.

2. The method of claim 1, wherein removing the portal includes expanding a size of the portal.

3. A method of moving a view provided to a spectator within an environment of a video game, comprising:
   providing an interface for presenting a first view of the video game on a client device of the spectator of the video game, the first view having a first vantage point and includes a game object;
   providing a portal within the interface for presenting a second view of the game object, the second view having a second vantage point, the portal is overlaid to cover a portion of the first view; and
   moving the second vantage point toward the game object to a third vantage point such that a virtual position of the spectator is brought closer to the game object within the portal, while the first view remains at the first vantage point outside the portal;
   wherein the portal provides a pulling function for pulling the virtual position of the spectator as the game object moves.

4. The method of claim 3, further comprising,
   removing the portal during at least a portion of said moving the second vantage point, said moving of the portal includes expanding a size of the portal such that the second view replaces the first view in the interface.

5. The method of claim 4, wherein during the pulling one or more additional portals are created, each of the one or more additional portals is triggered when the game object moves a predetermined distance away from the virtual position of the spectator.

6. Computer readable media having non-transitory program instructions for moving a view of a spectator within an environment of a video game, comprising:
   program instructions for generating an interface for presenting a view of the video game to the spectator of the video game, the view having a first vantage point and includes a game object;
   program instructions for providing a portal within the interface for presenting a second vantage point of the game object, the portal is overlaid to cover a portion of the view;
   program instructions for moving the second vantage point closer toward the game object such that the view is brought closer to the game object within the portal, while the view remains at the first vantage point outside the portal;
   program instructions for removing the portal during at least a portion of said moving the second vantage point; and
   program instructions for providing one or more additional portals when the game object moves a predetermined distance away from a virtual position of the spectator.

7. The computer readable media of claim 6, wherein removing the portal includes expanding a size of the portal.

8. The computer readable media of claim 7, wherein when the game object moves away from a virtual position of the spectator, a series of one or more additional portals are created to repeatedly bring the virtual position of the spectator closer to the game object.

* * * * *